United States Patent [19]

Genusov et al.

[11] Patent Number: 5,179,530
[45] Date of Patent: Jan. 12, 1993

[54] ARCHITECTURE FOR INTEGRATED CONCURRENT VECTOR SIGNAL PROCESSOR

[75] Inventors: Alexander Genusov; Ram B. Friedlander, both of Haifa, Israel; Peter Feldman, Pittsburg, Pa.; Vlad Fruchter; Ricardo Jaliff, both of Haifa, Israel; Asaf Mohr, Cupertino, Calif.; Rafi Retter, Haifa, Israel

[73] Assignee: Zoran Corporation, Santa Clara, Calif.

[21] Appl. No.: 711,573

[22] Filed: May 31, 1991

Related U.S. Application Data

[63] Continuation of Ser. No. 431,490, Nov. 3, 1989, abandoned.

[51] Int. Cl.$^5$ ............................................. G06F 15/332
[52] U.S. Cl. ..................................... 364/726; 364/736; 364/748; 364/DIG. 1; 364/231.8; 364/231.9; 364/232.21; 395/800
[58] Field of Search ................ 395/800; 364/736, 748, 364/726

[56] References Cited

U.S. PATENT DOCUMENTS

| | | | |
|---|---|---|---|
| 4,589,067 | 5/1986 | Porter et al. | 395/800 |
| 4,706,191 | 11/1987 | Hamstra et al. | 364/200 |
| 4,720,780 | 1/1988 | Dolecek | 364/736 |
| 4,758,975 | 7/1988 | Omoda | 364/736 |
| 4,823,258 | 4/1989 | Yamazaki | 364/200 |
| 4,853,872 | 8/1990 | Shimoi | 364/200 |
| 4,860,249 | 8/1989 | Nicely et al. | 364/736 |
| 4,875,161 | 10/1989 | Lahti | 364/200 |
| 4,891,751 | 1/1990 | Call et al. | 395/800 |
| 4,922,418 | 5/1990 | Dolecek | 364/736 |
| 4,933,839 | 6/1990 | Kinoshita et al. | 364/200 |
| 4,949,247 | 8/1990 | Stephenson et al. | 395/800 |
| 4,964,035 | 10/1990 | Aoyama et al. | 364/200 |
| 4,996,661 | 2/1991 | Cox et al. | 364/726 |
| 5,053,987 | 10/1991 | Genusov et al. | 364/736 |
| 5,068,819 | 11/1991 | Misra et al. | 364/736 |

Primary Examiner—Michael R. Fleming
Assistant Examiner—Debra A. Chun
Attorney, Agent, or Firm—Townsend and Townsend

[57] ABSTRACT

Multiple special purpose processing units are provided in a vector signal processor for concurrent, parallel processing, particularly of complex vectors. The principal processing units are an execution unit, a data movement unit, a control/register unit, a vector buffer unit, an instruction fetch unit, and a bus interface unit.

4 Claims, 33 Drawing Sheets

ARCHITECTURE FOR INTEGRATED CONCURRENT VECTOR SIGNAL PROCESSOR

This application is a continuation of Ser. No. 431,490, filed Nov. 3, 1989, now abandoned.

BACKGROUND OF THE INVENTION

1. Field of the Invention

This invention relates to a high speed computing apparatus and, more particularly, to a concurrent vector processor architecture for signal and image processing.

2. Prior Art

Signal processing algorithms operate mainly with one-and two-dimensional data arrays. Typical applications include digital filtering, Fast Fourier Transform (FFT) and post-processing. These applications require an extremely high processing throughput to handle large size arrays. Traditionally, integrated signal processors have been designed either as general purpose processors or as special purpose processors. Each of these two approaches to processor architecture design requires tradeoffs to be made between high performance and generalpurpose capability. Only a few processor designs have attempted to provide high speed architectures which are also capable of efficiently performing a wide variety of signal processing algorithms.

Signal processing throughput requirements have been conventionally expressed in terms of a required number of multiplies and additions per second. General purpose signal processors attempt to meet these requirements by using extremely fast arithmetic units implemented with state of the art technology. A vector processor which utilizes arithmetic pipeline processing enables higher throughput to be achieved while employing conservative fabrication technology or to obtain a significant savings of silicon area. High speed data processing also requires the use of a very efficient data transfer mechanism which is capable of accessing multi-dimensional arrays.

OBJECTS OF THE INVENTION

It is an object of the invention to provide a vector signal processor which processes signal data in an improved manner.

It is another object of the invention to provide a vector signal processor which processes signal data with higher computation throughput.

It is another object of the invention to provide a vector signal processor which processes signal data with a greater storage bandwidth.

It is another object of the invention to provide a vector signal processor having an optimal mix of computation and data movement capabilities.

It is another object of the invention to provide a vector signal processor having a high level vector-oriented instruction set to support easy programming of signal processing algorithms.

It is another object of the invention to provide a vector signal processor having improved control over simultaneous operations of data movement, vector arithmetic, register arithmetic, and program flow.

SUMMARY OF THE INVENTION

These and other objects, features and advantages are achieved by the concurrent vector signal processor architecture disclosed herein.

The concurrent vector signal processor is a programmable integrated processor which includes multiple specialpurpose processing units. In order to optimize throughput, real-time signal processing requires extensive concurrency which is achieved by pipeline and parallel processing. The concurrent vector signal processor incorporates independent operation-specific processing units which allow parallel execution of memory-to-memory transfers, arithmetic, program control and instruction fetch operations.

The concurrent vector signal processor is a Multiple Instruction Multiple Data stream (MIMD) processor. This means that the overall processing task is distributed among the processing units for the purpose of increasing processing parallelism. Internal task scheduling and synchronization is handled by a resource manager which dispatches instructions to the appropriate processing units. The main internal functional units are an execution unit, a data movement unit, a control/register unit, a vector unit, a fetch unit, and a bus interface unit. The concurrent vector signal processor internal architecture incorporates multiple busses and is optimized for complex vector arithmetic operations.

The concurrent vector signal processor has a single external bus that serves both instruction fetch and memory to memory transfers. Utilization of the external bus is very efficient due to the high-level vectorized instruction set, the high-speed memory transfers (50 MBytes/sec) and the overlap between arithmetic operations, memory to memory transfers (to/from different internal RAM section), and instruction fetch. These features, together with the embedded mechanism to support multiple-processing environment, enable the concurrent vector signal processor to achieve very high operation throughput in systems with a single or multiple processors architecture.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
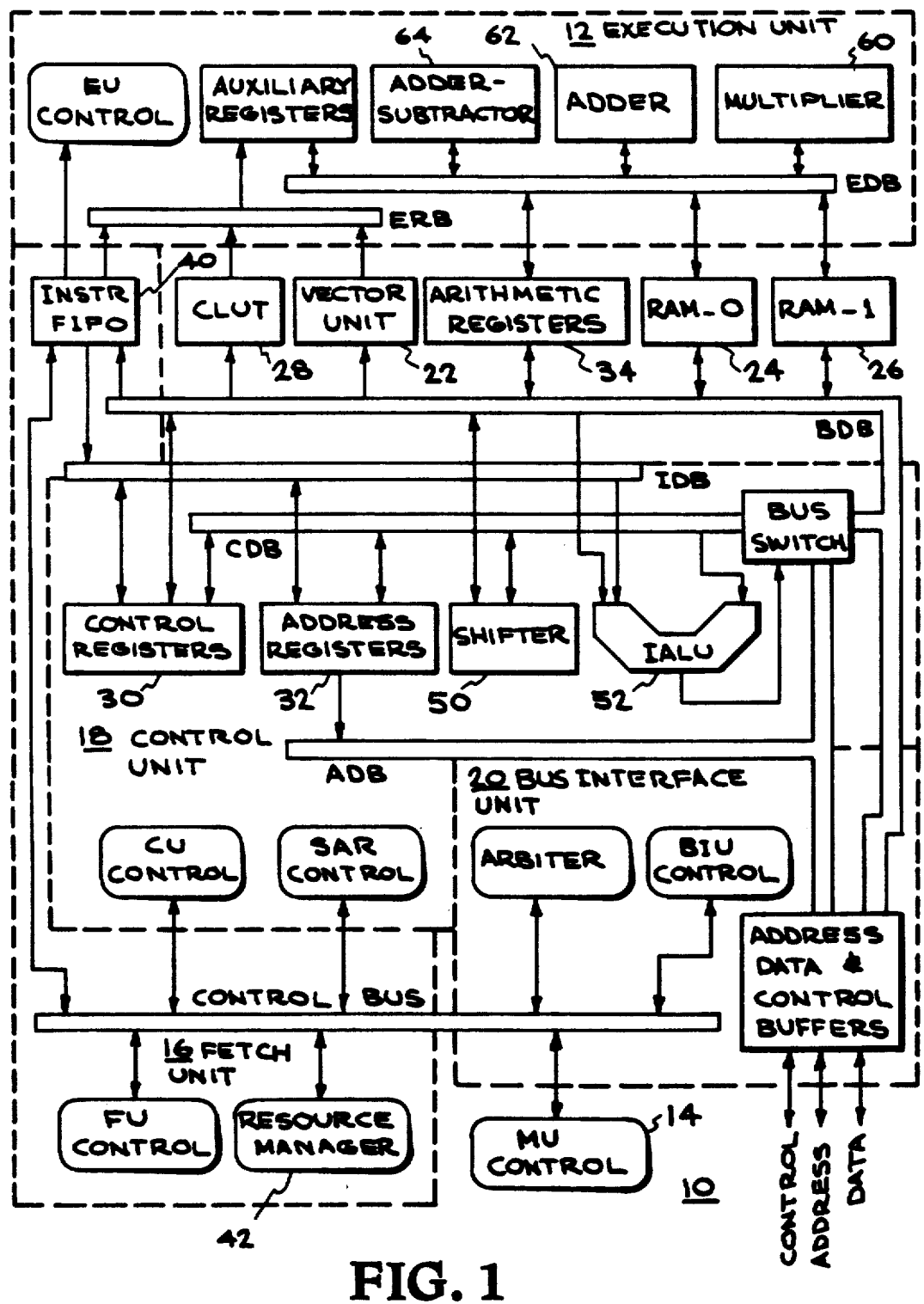
FIG. 1 is a functional block diagram of the concurrent vector signal processor according to the invention.

FIG. 1 illustrates the internal architecture of the concurrent vector signal processor 10 according to the invention. A detailed description of each unit is given below.

This architecture incorporates a number of independent, operation-specific processing units. The processing units can operate concurrently to thereby achieve maximum efficiency in long vector and matrix operations. A number of typical digital signal processing DSP primitives like Fast Fourier Transform, demodulation, and power calculation are embedded in the processor architecture. The DSP as well as other vector and matrix operations are each implemented by a single processor instruction.

Table 1 shows a high level vectorized instruction set which makes programming easier and results in fewer processor elements and fewer external bus accesses being used for instruction-fetch functions. As a consequence, a single bus can be used for both data and program instructions. This greatly simplifies the concurrent vector signal processor interface with external components. An internal instruction queue provides further improvement in bus utilization.

TABLE 1

| Category | Mnemonic | Function |
|---|---|---|
| Data Move | INADR | Indirect Addressing |
| | LD | Vector Load |
| | LUT | Look-up Table |
| | ST | Vector Store |
| | TRAN | Vector Transfer |
| Arithmetic | ADD | Vector Add |

TABLE 1-continued

ZR34325 Instruction Set

| Category | Mnemonic | Function |
|---|---|---|
| Vector Basics | ADDL | Vector Add Long |
| | ADDSUB | Vector Add Subtract |
| | MAD | Vector Multiply and Add |
| | MAG | Vector Magnitude |
| | MGSQ | Vector Magnitude-Square |
| | MULT | Vector Multiply |
| | MLTL | Vector Multiply Long |
| | SBM | Vector Subtract & Multiply |
| | SUB | Vector Subtract |
| Arithmetic | ACC | Vector Accumulate |
| Vector to | MIN | Vector Minimum Search |
| Scalar | MAX | Vector Maximum Search |
| Format | ALIGN | Vector Align Exponents |
| Conversion | INTFP | Vector Integer to Floating-Point |
| | FPINT | Vector Floating-Point to Integer |
| | JOIN | Vector Join |
| | SPLIT | Vector Split |
| Matrix | MTX | Matrix Multiply |
| | FMTX | Fast Matrix Multiply |
| Polynomial | POLY | Vector Polynomial Expansion |
| Signal | DEMO | Vector Modulation/ Demodulation |
| Processing | DFT | Discrete Fourier Transform |
| | FFT | Fast Fourier Transform |
| | FIR | Finite Impulse Response Filter |
| | IDFT | Inverse Discrete Fourier Transform |
| | IFFT | Inverse Fast Fourier Transform |
| | IIR | Infinite Impulse Response Filter |
| Post Processing | CLIP | Vector Clip |
| | CMP | Vector Compare |
| | LIMIT | Vector Limit |
| | SIGN | Vector Sign |
| Registers | LDR | Load Registers |
| Move | MOVFR | Move Floating-Point |
| Register | MOVR | Move Integer Register |
| | PUSH | Push Registers |
| | POP | Pop Registers |
| | STR | Store Registers |
| Integer | ADDR | Add Registers |
| Arithmetic | DECR | Decrement Registers |
| | DSETR | Decrement and Set Registers |
| | INCR | Increment Registers |
| | ISETR | Increment and Set Registers |
| | SETR | Set Registers |
| | SHLR | Shift Left Registers |
| | SHLSETR | Shift Left Set Registers |
| | SHRR | Shift Right Registers |
| | SHRSETR | Shift Right Set Registers |
| | SUBR | Subtract Registers |
| Registers | ANDR | Logical AND Registers |
| Integer Logical | ORR | Logical OR Registers |
| | XNORR | Logical Exclusive NOR Registers |
| | XORR | Logical Exclusive OR Registers |
| Floating-Point | ADDFR | Add Floating-Point Register |
| Arithmetic | SETFR | Set Floating-Point Register |
| | SUBFR | Subtract Floating-Point Register |
| Control Flow | CALL | Call Subroutine |
| | HLT | Halt |
| | JMP | Jump |
| | JMPC | Jump Conditional |
| | LOOP | Program Loop |
| | NOP | No Operation |
| | RET | Return from Subroutine |
| | RETI | Return from Interrupt |
| | SYNC | Synchronize |

The combination of a parallel-processing architecture, a high level instruction set, a simple system interface, use of floating-point arithmetic, and the use of general purpose control capabilities allows the concurrent vector signal processor according to the invention to achieve performance comparable to an array processor.

The concurrent vector signal processor contains six main processing units: an execution unit 12, a move unit 14, a fetch unit 16, a control unit 18, a bus interface unit 20, and a vector buffer unit 22. A number of other resources are available within the processor 10: an internal RAM 24, 26; a coefficient lookup table 28; internal registers including control registers 30, address registers 32, and arithmetic registers 34; and a multiple internal bus arrangement.

The processing units are independent and in many circumstances they can be operated concurrently (simultaneously). The ability to utilize a number of processing units for execution of a complex operation results in very high operational throughput.

Figure 2A:
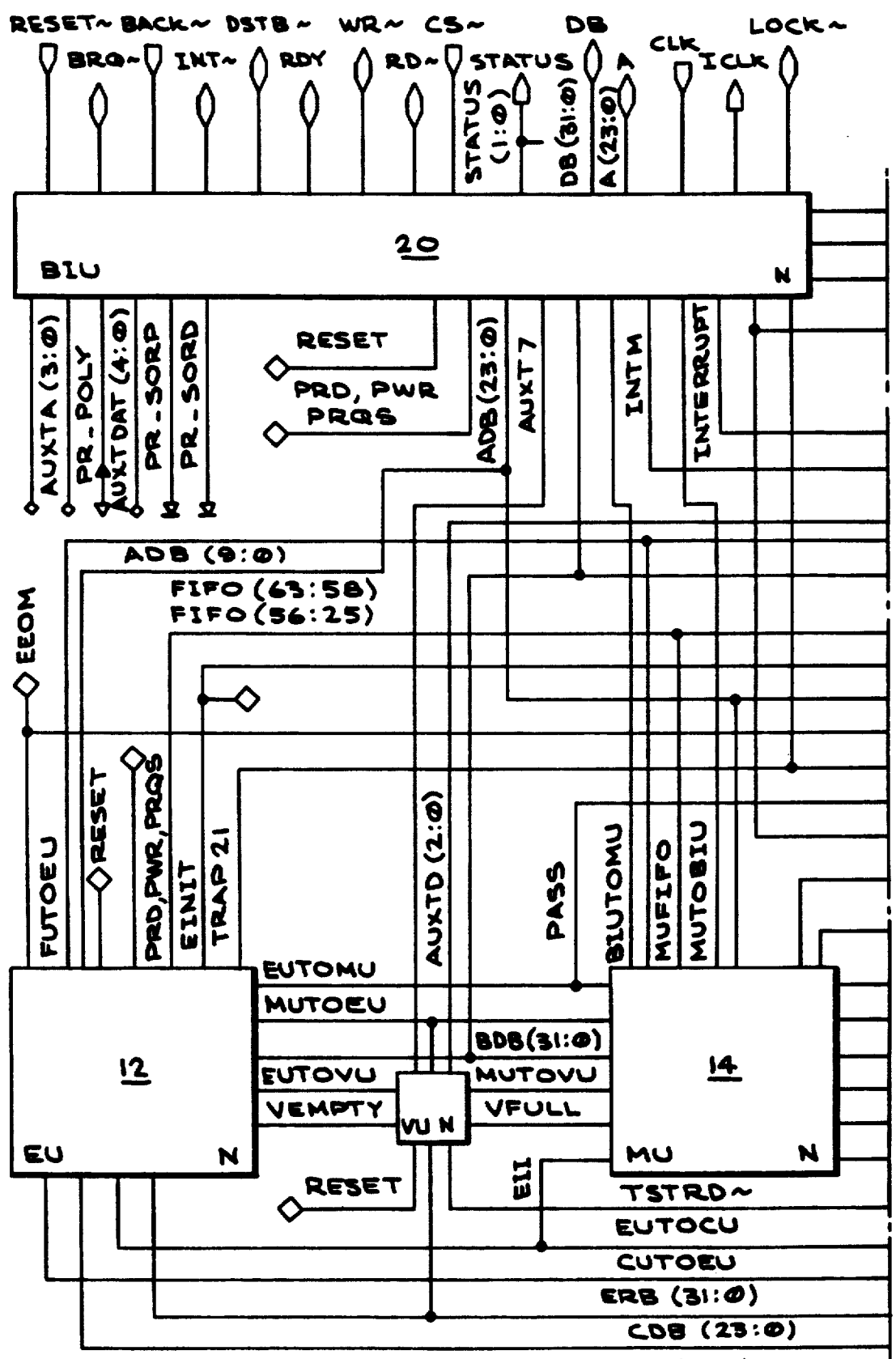
FIGS. 2A and 2B are schematic block diagrams of the concurrent vector signal processor according to the invention.
Figure 2B:
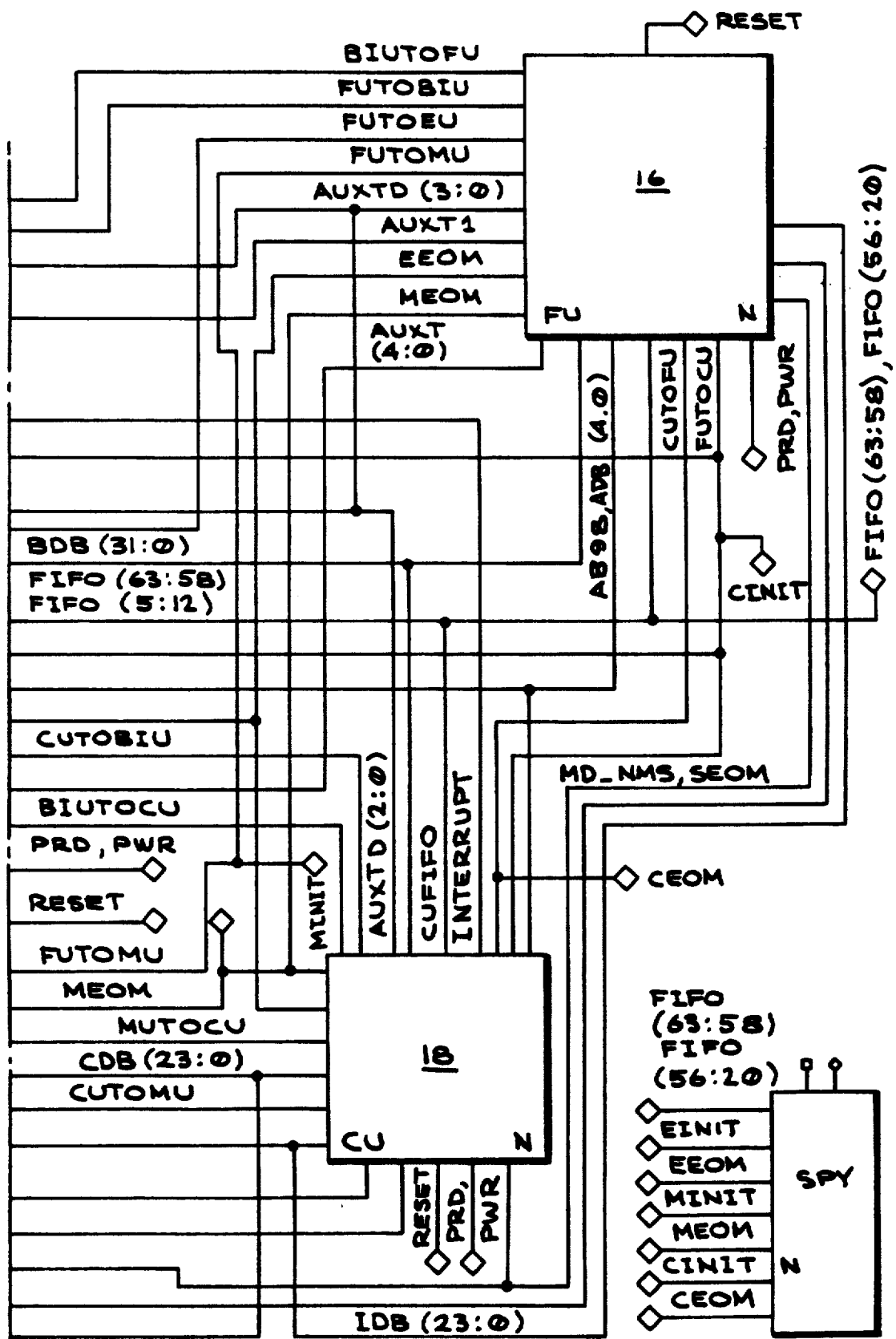
Figure 3A:
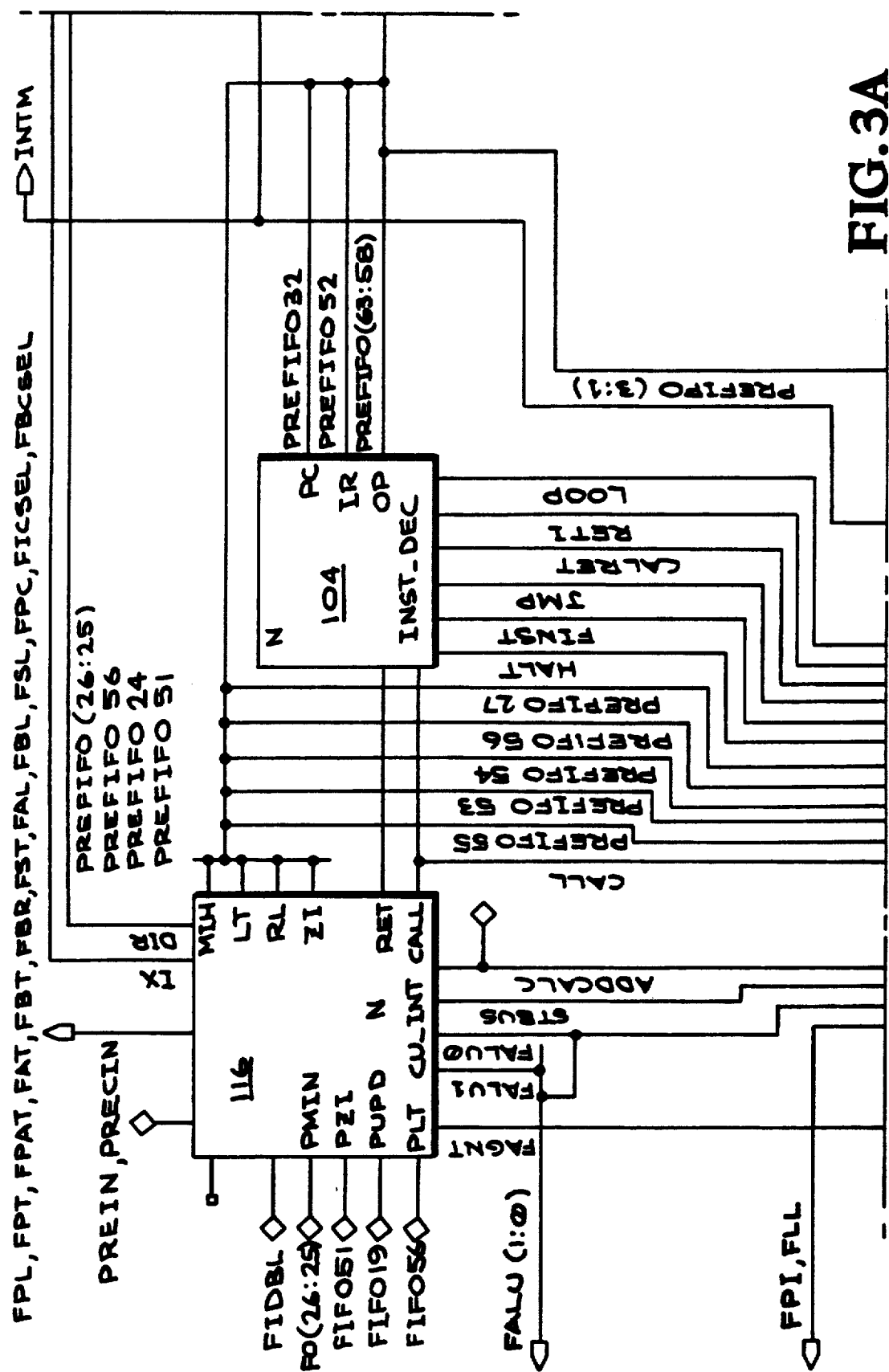
FIGS. 3A-3D are schematic block diagrams of a fetch unit.
Figure 3B:
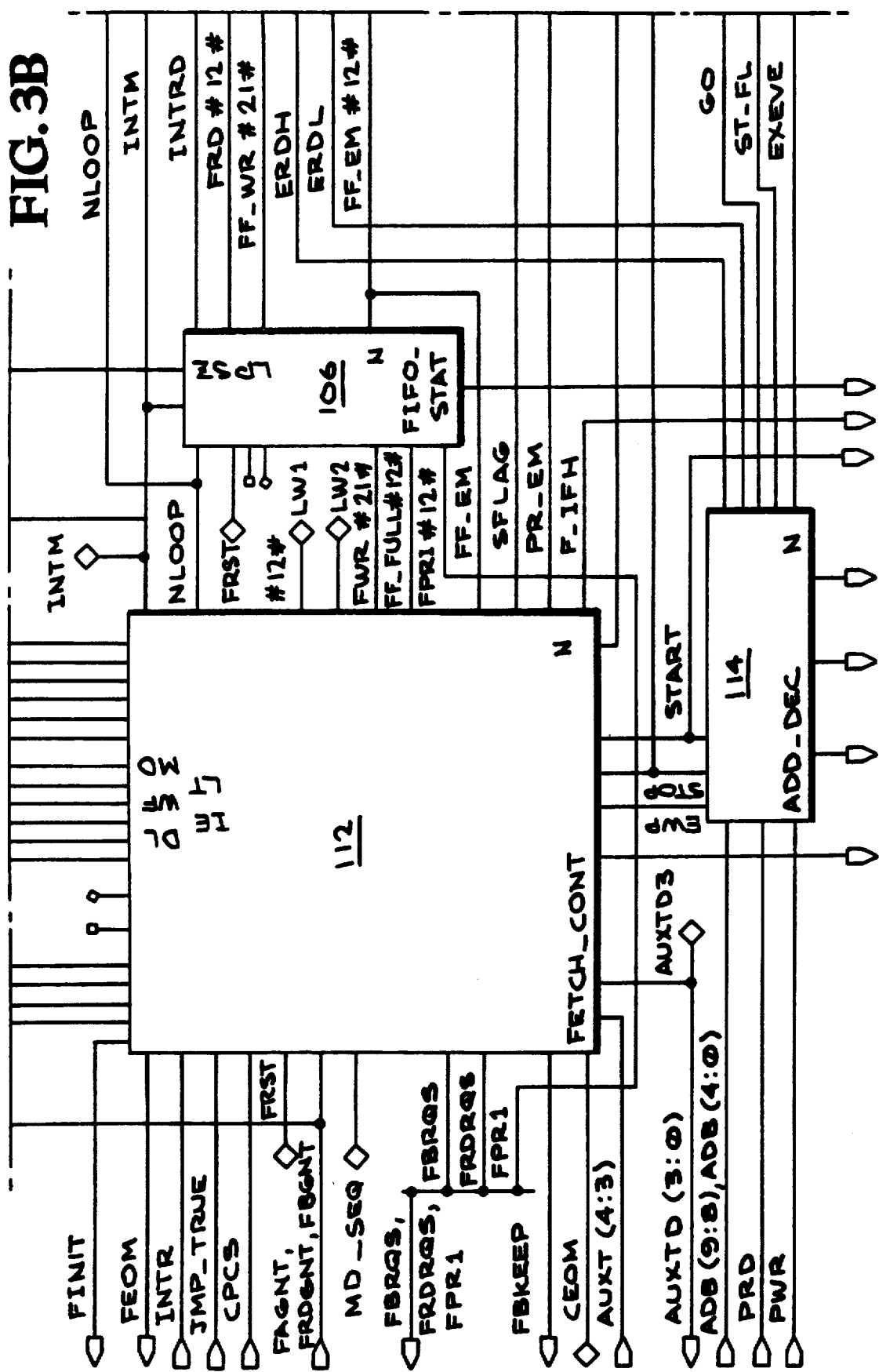
Figure 3C:
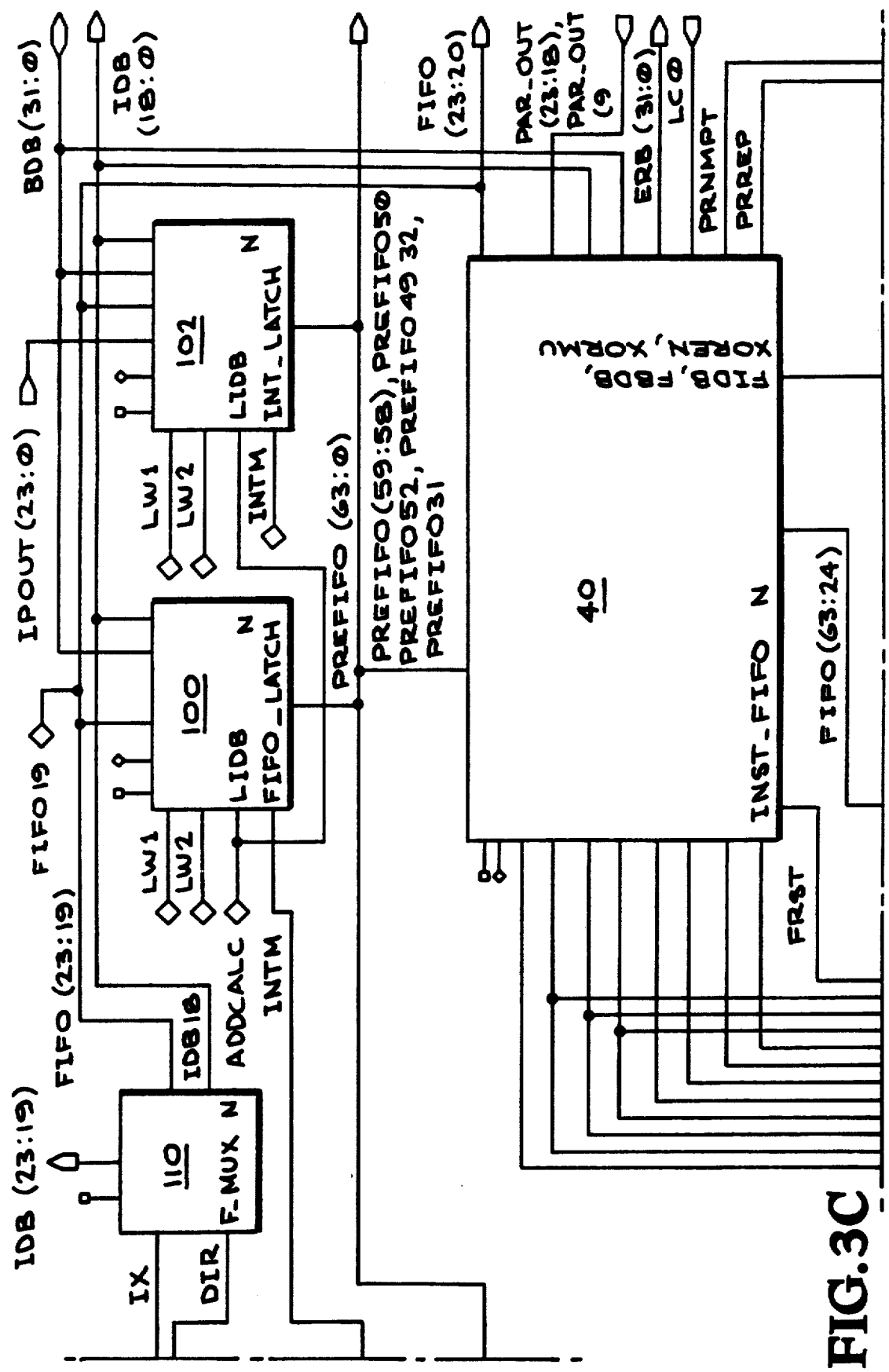
Figure 3D:
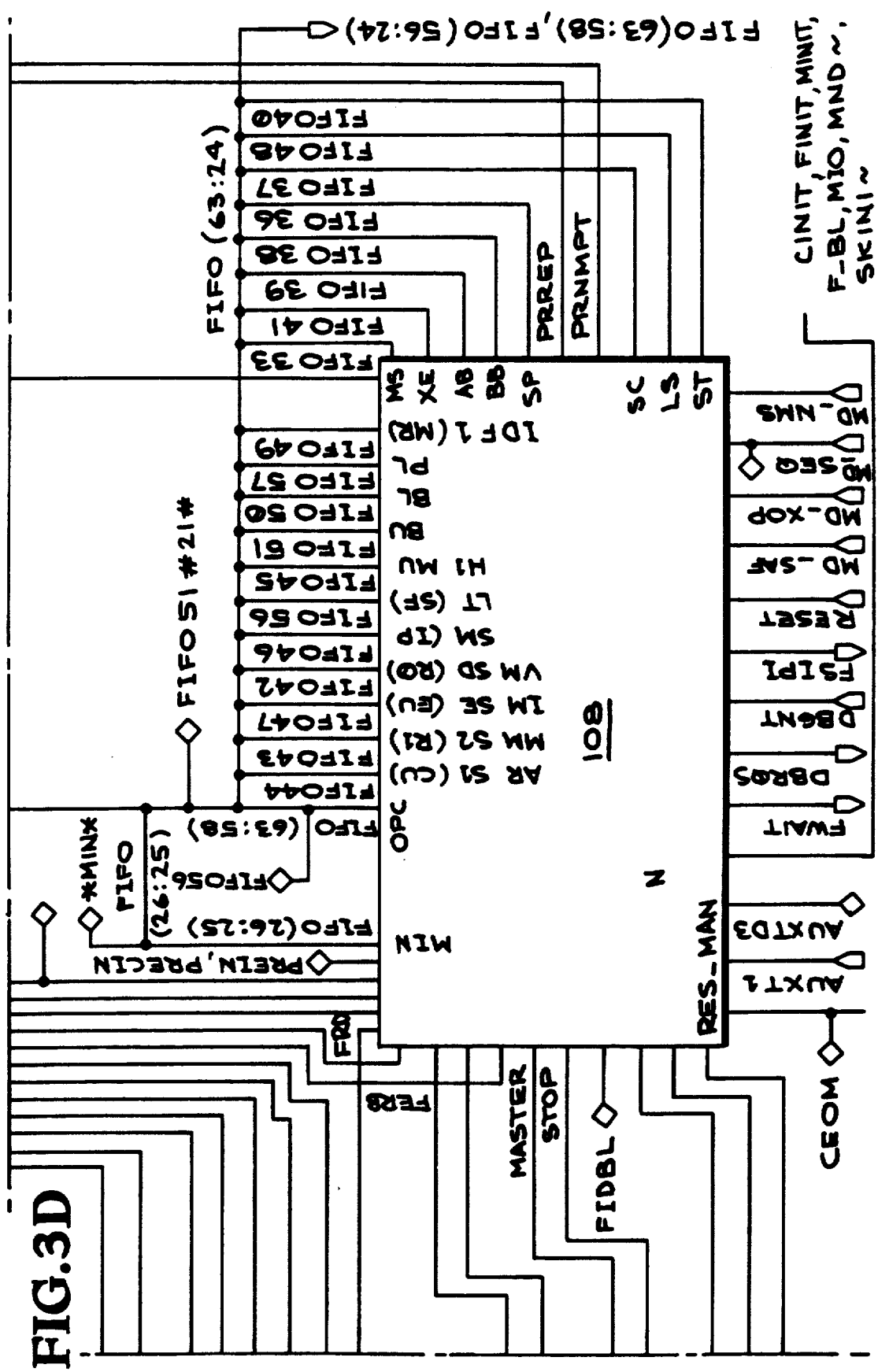

FIG. 2 shows the communication links between various processor units, which consist of: multiple data busesBDB(31:0), CDB(23:0), ERB(31:0), IDB(23:0), FIFO(63:0); an address bus - ADB(23:0); auxiliary test buses and control signals, grouped according their origin and destination, e.g., CUTOEU - control signals created in the CU arrive to the EU. All external pins are connected to the BIU. For simulation purpose a SPY block monitors the current status of the internal processing units CU, EU, FU (separate block) and MU.

The execution unit (EU) 12 performs all floating-point arithmetic processing. Data is transferred between this unit and the external bus using the vector unit 22 as a buffer. A store arithmetic registers (SAR) mechanism controls transfer of data from the arithmetic registers 34 to external memory. The execution unit 12 makes extensive use of pipelining to provide efficient vector operations. All arithmetic operations conform to the IEEE 754-1985 Standard. This unit provides floating-point to integer and integer to floating-point conversions. Conversion between IEEE floating-point and two integer formats, 24-bit and 16-bit, and vice versa are supported.

The move unit (MU) 14 performs data movement operations between internal and external memories. It also fetches external operands into the vector unit 22. External memory accesses are handled by a flexible DMA protocol that supports block transfer operations. Four addressing modes are supported: direct, indirect, indexed and indexed indirect. A special Look Up Table instruction converts data values to entries stored in an external table.

The vector unit (VU) 22 decouples the execution unit 12 from the external bus by buffering external operands, which are fetched by the move unit 14. Repetitive use of scalers and short vectors is supported without additional fetching.

The fetch unit (FU) 16 fetches instructions and executes program flow control instructions. Short loops can be fully contained within an instruction FIFO 40, and executed without being repeatedly fetched, thus reducing bus access. Instruction fetching can be initiated at power-up or by an external host. The concurrent vector signal processor arithmetic instruction execution time is generally much longer than the instruction fetch time. Thus instruction fetches and data transfers can share the same address and data busses without performance degradation The control unit (CU) 18 supports arithmetic, logic, and data transfer operations to the internal registers. It also handles external stack operations required for the implementation of subroutine call and return instructions.

The bus Interface unit (BIU) 20 controls external memory access. Both fast and slow memories are supported. The bus interface unit 20 functions as an arbiter to prioritize internal bus operations and to prioritize external bus operations between internal units to avoid conflict and to achieve maximum bus utilization. It provides all of the required controls for the external system interface and supports external access to the concurrent vector signal processor internal registers and memory.

In addition to these basic processing units, the concurrent vector signal processor contains a number of other resources:

The internal data RAM consists of 128 32-bit words, which are organized as an array of 64 complex words. This RAM can be used as a single array or as two separate arrays, RAM_0 and RAM_1, respectively 24, 26, each containing 32 complex words. This configuration permits the simultaneous operation of the execution unit 12 and the move unit 10 on separate RAM sections. Both the execution unit 12 and the move unit 14 provide a variety of addressing sequences for the internal RAM to support various specialized instructions such as the matrix multiply instruction or the FIR filter instruction.

The coefficient lookup table (CLUT) 28 contains 256 complex floating-point coefficients that provide sine and cosine values for performing processor instructions which have sine or cosine values as one of the operands (e.g. FFT). The execution unit 12 generates address sequences for this table. The table 28 can be read by an external host computer.

The internal registers are organized into three groups: control registers 30, address registers 32, and arithmetic registers 34. These internal registers are memory-mapped into the external address space so they can be accessed by external devices.

The control registers 30 are 24 bits wide and contain information on the concurrent vector signal processor internal status, interrupt flags, and instruction loop counts. The concurrent vector signal processor has several operating modes and can respond to internal and external interrupts.

The address registers 32 are 24 bits wide and are used for external addressing.

The arithmetic registers 34 are 32 bits wide and include two accumulators and an extreme value (minimum or maximum) register.

The multiple internal bus structure supports a high degree of operational parallelism. Virtually, all concurrent vector signal processor main units can work simultaneously if no resource sharing is required.

Concurrent Operation

The concurrent vector signal processor internal units can operate concurrently. A sequence of program instructions, which are fetched sequentially, is broken internally into specific subsequences for each unit such as, for example, control or data movement operations. Execution of these subsequences of instructions depends on the availability of the appropriate units and the other resources. All instructions that enter the instruction queue are started in the order they were fetched, but are not necessarily completed in that same order due to the fact that various instructions are executed in parallel in different units with different execution times.

Dispatching of the instructions for execution is done by a resource manager 42 of the fetch unit 16 in accordance with an operating mode. A user can choose sequential or concurrent mode of operation by setting the SEQ bit in a $MODE register. In the sequential mode, only one instruction can be executed at a time and the instructions are executed in the order they were fetched. In the concurrent mode, parallel operation is supported with mechanisms for task synchronization, resource allocation, and deadlock avoidance to avoid conflicts in internal and external bus access.

Fetch Unit

FIG. 3 shows the fetch unit 16 which performs instruction prefetching, storage, predecoding and initialization along with management of resources. It also executes branch instructions.

All ZR34325 instructions consist of two 32-bit words. They are loaded into a Fifo-Latch 100 (or an Int-Latch 102 in the Interrupt mode) and copied to an empty slot of the Inst-Fifo 40, if available. Branch instructions are decoded by a Inst-Dec 104 prior to entering the Inst-Fifo 40. If execution of the branch instruction can be completed in the FU 16, the instruction won't enter the Inst-Fifo 40 (e.g., JMP). Branch instructions, executing in two phases like CALL, will enter the Inst-Fifo 40 after the Program Counter has been changed. Availability of the slots in the Inst-FIfo 40 is controlled by a Fifo-Stat 106. The processor also supports internal instruction loops when a LOOP instruction is decoded by the Inst-Dec 104. In that case up to four instructions which reside in the Inst-Fifo 40 can be performed repetitively without fetching.

In the Interrupt mode the Inst-Latch and Inst-Fifo 40 are frozen and instructions are loaded into the Int-latch 102 and transferred directly to the Inst-Fifo output bus Fifo (63:0).

At the Inst-Fifo output, instructions are predecoded in order to determine which of the internal processing units is required for instruction execution. The Res-Man 108 determines also storage resources to be used in the next instruction. Availability of processing and storage resources is managed using scoreboard technique. The resources are allocated for a new operation when appropriate initialization signals CINIT, EINIT and/or MINIT are issued, and released when termination signals CEOM, EEOM, and/or MEOM are encountered.

During initialization of instructions with external operands, an address calculation is performed. The starting address (or pointer to the starting address, if indirect addressing is used) will be the result of IALU operation (see CU) between specified index register (if indexed addressing is used) or zero and instruction field. The latter is transferred to IDB (23:0) bus through an F-Mux 110.

In order to utilize 'double buffered' structure of the RAM and save the code length (e.g., for internal looping), the instruction parameters which determine the RAM Section to be operated on can be changed (XORed with LSB of the Loop Counter) if XOR bit in the Mode register is set.

The instruction fetching and branch is handled by a Fetch-Cont 112. This unit asserts request lines FBRQS or FRDRQS to the Arbiter (see BIU) when internal bus or external bus (read) operation is required. It also controls various operation modes of the FU: Slave, Master and Interrupt. The operation modes can be changed either internally (e.g., decoding of HLT instruction) or via write access from external device. In the latter case address is decoded in an Add-Dec 114.

The FU operates on the following address registers which belong to the CU: A-Index, B-Index, Stack Pointer, Program Counter. The required control signals are produced in a Cu-Int 116.

The internal instruction FIFO 40, out of which the concurrent vector signal processor executes all of its instructions, is written to in one of three modes:

1. In the Slave Mode, a host processor writes instruction directly into the concurrent vector signal processor instruction FIFO 40 using its memory mapped address.

2. In the Master Mode, the concurrent vector signal processor fetches its own instructions from the external memory and stores them in the instruction queue (FIFO) 40.

3. In the Interrupt Mode, the concurrent vector signal processor operates the same as the Master Mode, except that the instruction queue 40 is frozen and instructions are executed immediately after being fetched.

The fetch unit 16 starts execution in the interrupt mode at power-up and can switch between modes. Its operation can be controlled by an external device or a power-up circuitry, and by the concurrent vector signal processor program flow instructions.

The fetch unit 16 manages the instruction queue 40 that is implemented as a FIFO with four 64-bit words. Program flow instructions are decoded and executed by the fetch unit 16 and do not enter the instruction queue. Other instructions are executed by some combination of the execution unit 12, the move unit 14, and the control unit 18. Such instructions begin execution in the order in which they enter the instruction queue but they may not end in the same order. Instructions, pending in the queue, are started when the required resources become available.

The concurrent vector signal processor includes a number of instructions for program flow control: HLT, JMP, JMPC, LOOP, CALL, RET, RETI and SYNC. The first four are executed without entering the instruction queue 40. HLT stops instruction fetching and changes the fetch unit mode to the slave mode. JMP and JMPC change the program flow by loading the program counter with new contents (JMPC only if a specified condition is fulfilled). Execution begins at the new program counter value either immediately or after certain conditions have occurred.

The CALL, RET and RETI instructions are executed in two phases: (i) the program counter ($PC) is changed before new instructions enter into the instruction queue; (ii) for the CALL instruction, the previous program counter and other specified registers are stored/loaded into/from the stack.

The synchronize instruction (SYNC) waits for certain specified conditions to be met. The instruction mechanism checks that certain internal resources are available prior to continuing operation. In addition it can suspend the processor operation until external event occurs. The SYNC instruction can require that any combination of these conditions be fulfilled before execution proceeds.

The Interrupt mode is initiated by an unmasked interrupt request, provided that the INI bit (enable interrupt handling) in the $MODE register is set. In this mode the instruction queue is frozen and instructions are executed immediately after being fetched. The instruction fetch mode will return to the mastermode if the Return from Interrupt (RETI) instruction is decoded. If instruction fetch is suspended by any mechanism, then, restarting instruction fetching without resetting the processor will return the fetch unit 16 to the interrupt mode.

Move Unit

Figure 4:
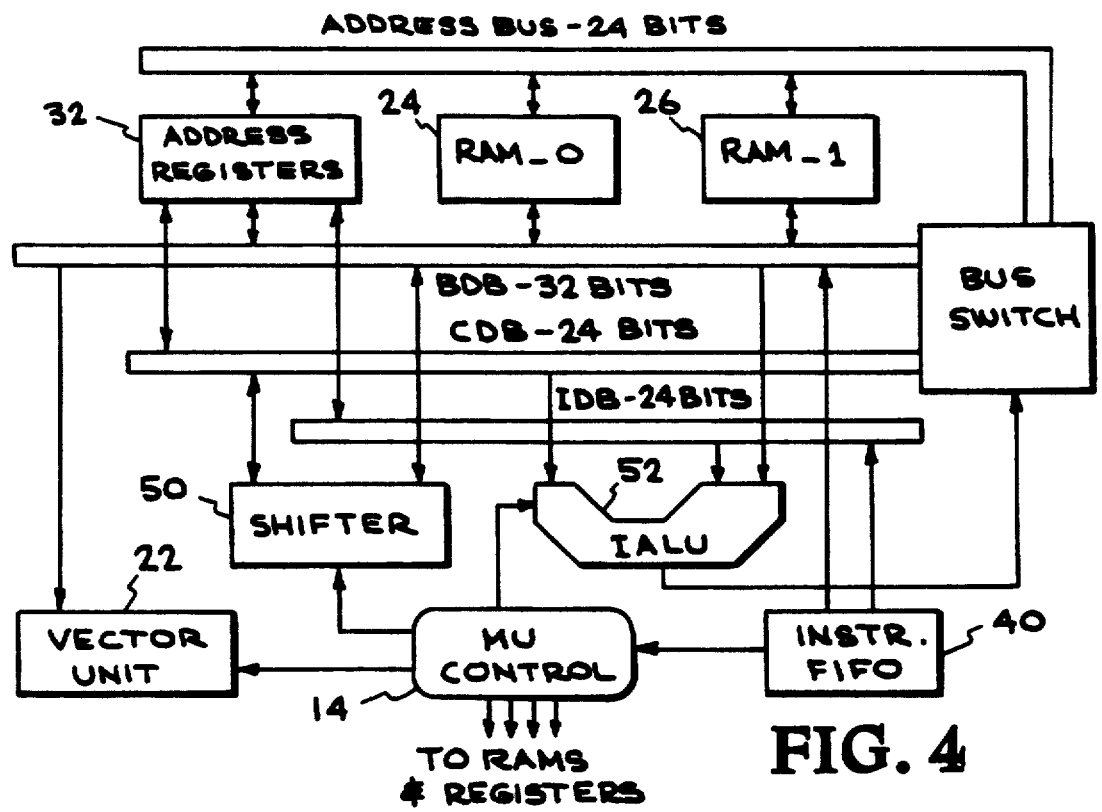
FIG. 4 is block diagram of a portion of a signal processor according to the invention, illustrating elements used in data movement operations.

FIG. 4 shows the processor elements used for the move unit 14 to perform data movement operations between internal and external memories. It provides various addressing capabilities, which allow easy access to external data organized as one or multi-dimensional arrays. For external address computation, the move unit uses a 24-bit shifter 50 and an integer IALU 52 as shown in FIG. 4. Besides data movement operations, the move unit 14 is employed in the execution of arithmetic instructions with external operands. In that case, external data is loaded into the internal RAM 24, 26 or the vector unit 22, usually in short bursts (for example, in FIR or complex multiplication instructions, respectively).

Figure 5:
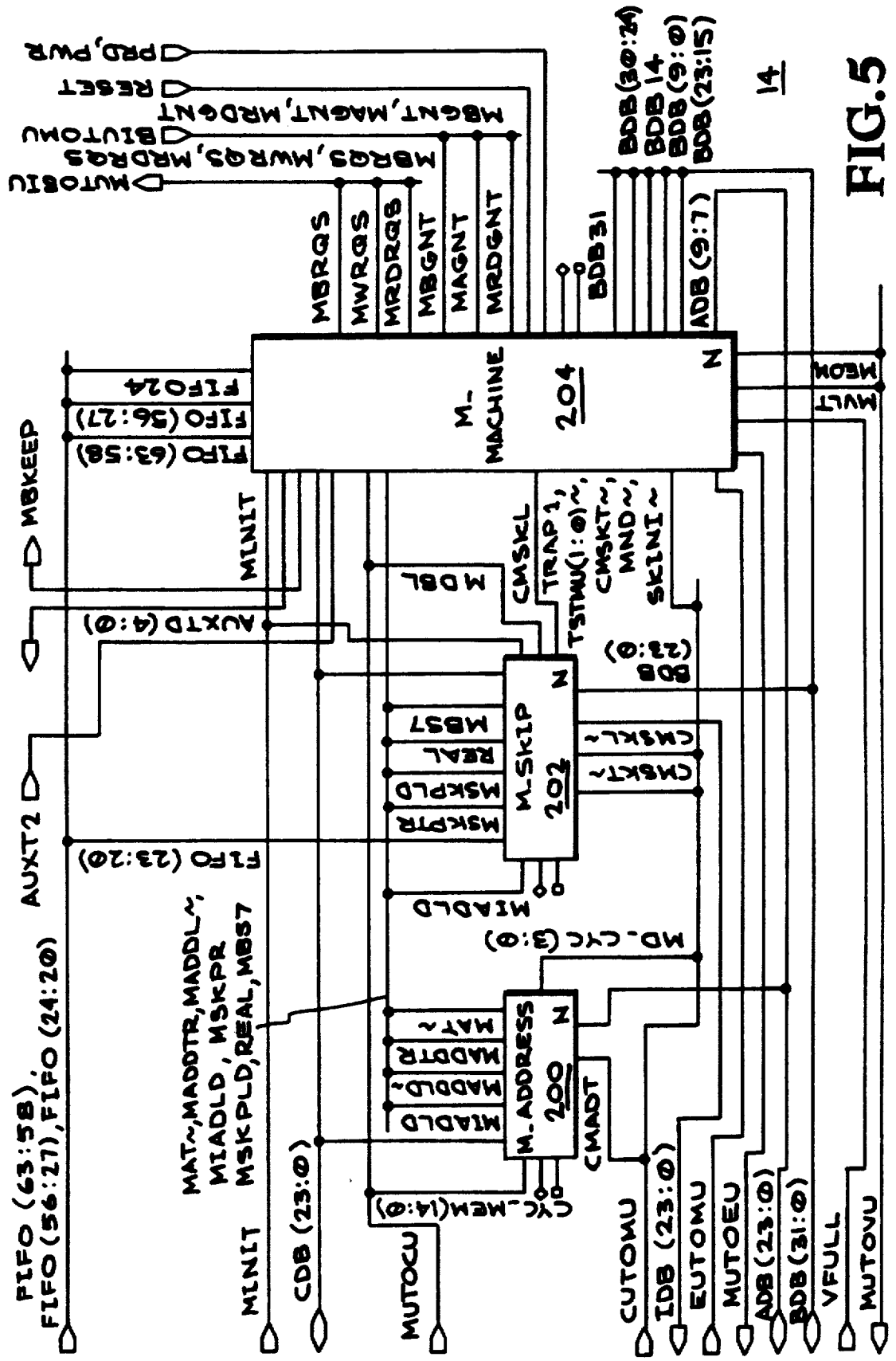
FIG. 5 is a schematic block diagram of a move unit.

FIG. 5 shows the MU 14 which performs data transfer between internal and external memories. It also fetches external operands into the VU 22 when required.

The MU 14 comprises three major blocks: M-Address 200, M-Skip 202 and M-Machine 204. The first two are used for effective address calculation during external memory access. M-Address contains the address of the next data point to be fetched or stored, while the M-Skip contents are equal to the step between consecutive blocks, defined as MSS-MBS.

The step calculation is performed at the initial phase of any move instruction with external operand (immediate or constant operands do not require continuous access to external memory). The MSS value, determined by 4-bit instruction field, is decoded and loaded into the M-Skip 202 with other instruction parameters by a derivative of MINIT signal. Similar decoding is done in the M-Machine 204 for MBS. Optionally, preloaded values of the MSS and MBS can be used instead of ones determined by instruction field. In the latter case, chosen when MBS=7, no decoding is required.

The calculated step value is loaded into the M-Skip 202 and is used for effective address calculation at the end of a block (MBS data points), incrementing the current value of the M-Address by the step value rather than by one. For address calculation the M-Address 200 is connected to the IALU in the CU by the bidirectional CDB (23:0) data bus. The next point address is transferred to the Address Buffer in the BIU via ADB (23:0) address bus.

Both M-Address 200 and M-Skip 202 can be accessed by external device using internal memory mapping. The decoding of appropriate addresses is performed in the CU and control of the read and write accesses is done with signals CMADT, CMSKT and CMSKL.

Utilization of the IALU (see CU) for address calculations is controlled by MUTOCU signals.

Execution of the move instructions and external operand fetch is fully controlled by the M-Machine 204. Bus operations are performed by the MU 14 only when requests MBRQS, MRDRQS or MWRRQS for bus, read or write access, respectively, are granted by the Arbiter (see BIU) on lines MBGNT, MAGNT and MRDGNT. The MU 14 is allocated for execution of specific instruction by the Resource Manager (see FU) when MINIT is asserted, and signals on completion of the execution by MEOM pulse. Communication with the EU is necessary when both operation blocks are allocated for execution of the same instruction (e.g., FIR). In external operand arithmetic instructions the M-Machine 204 loads data by issuing MVLT until VFULL (VU Fifo full) signal is asserted.

For testing purposes internal latches and counters of the M-Machine can be transferred to BDB (31:0) bus whenever external device reads an appropriate address.

The MU control is implemented as a combination of a state machine MPLA, various latches and counters and combinatorial logic.

The instruction parameters are latched during MINIT into the repeat counter REP-CNT, number-of-points counter NMPT-CNT and parameters latches M-Latch. Use of a new value for memory block size MBS depends on other instruction parameters. The length of operation is determined by the vector length (REPEAT and NMPT instruction fields), i.e., by status of the REP-CNT and NMPT-CNT. The interpolation option in Load (LD) instruction utilize the INTRP-CNT to control a number of zeroes to be inserted after each data point. These blocks together with the opcode decoder Op-Dec outputs, 'old states' and external signals from the EU, VU and Arbiter determine the next state of the state machine MPLA. The MPLA outputs control RAM operations and address calculations (see CU), and update the mentioned above counters.

Execution Unit

Figure 6:
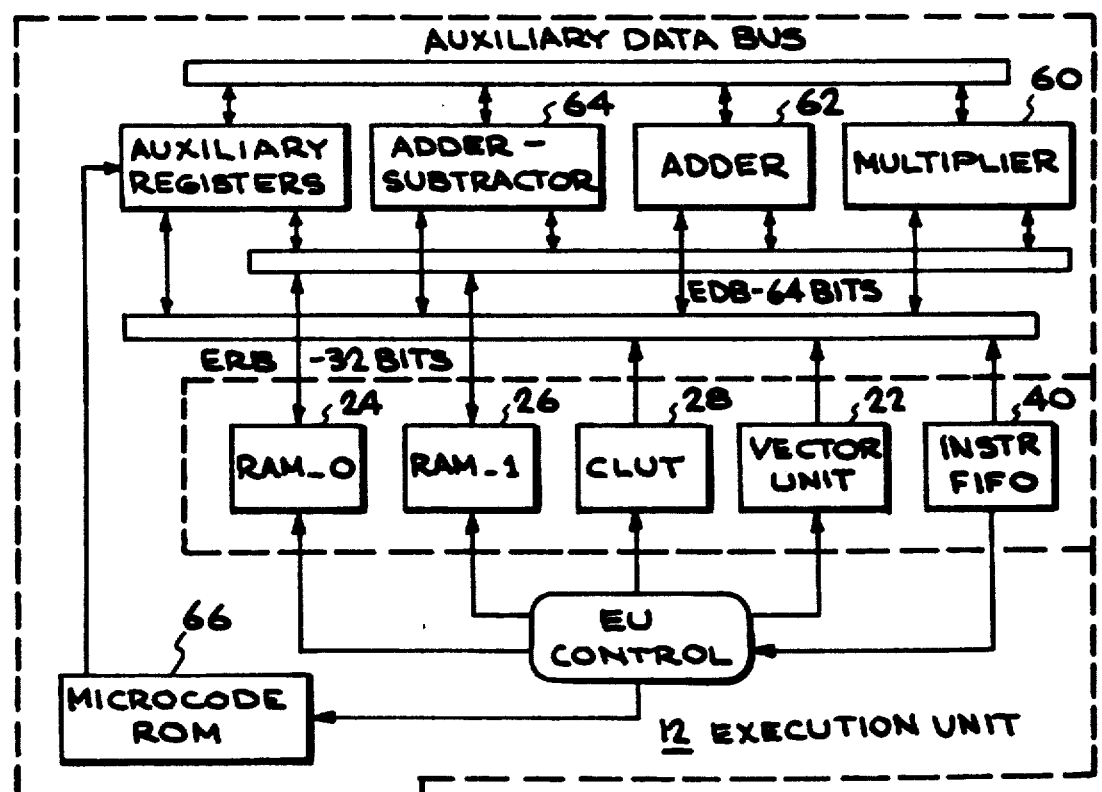
FIG. 6 is a simplified block diagram of an execution unit for a signal processor according to the invention.

FIG. 6 shows the main elements of the execution unit (EU) 12, which performs computations in IEEE floating-point format. It operates on internal and external vectors of various lengths and produces results that can be written into the internal RAM 24, 26 or into the arithmetic registers 32.

The execution unit 12 includes three computational units: a 32-bit floating-point pipelined multiplier 60; a 32-bit floating-point pipelined adder 62, and a 32-bit floating-point pipelined adder-subtractor 64, which also performs accumulation in extended 44-bit format. Three arithmetic registers 34 are accessible by several instructions. The internal pipeline registers, which are part of the multiplier 60, the adder 62, and the adder-subtractor 64 are inaccessible by program instructions. Mechanisms are provided for addressing of the internal RAM 24, 26 and for addressing the coefficient lookup table (CLUT) 28. The execution unit 12 also contains an instruction microcode ROM 66 and control circuitry with embedded looping capability (Repeat counter). The vector operand length can be defined in run-time using a preloadable register.

The basic arithmetic operations, which are implemented in the concurrent vector signal processor, include multiplication, addition, subtraction and comparison. Higher level functions (e.g. Matrix multiplication) utilize these basic operations. The execution unit 12 provides for simultaneous operations of all three computational units.

Internal Operands

The execution unit 12 operates on internal and external data. Internal operands reside in the internal RAM 24, 26 or arithmetic registers 34. The location of the first element of an internal operand (vector) is defined by the instruction fields. Instructions with trigonometric functions as an operand (FFT, DEMO, etc.) use the data in the internal coefficient look-up table (CLUT) 28.

External Operands

External operands are used in data movement, arithmetic and logical instructions. They are defined by the first element location, using one of the supported addressing modes (direct, indirect, indexed, and indexed indirect).

Figure 7:
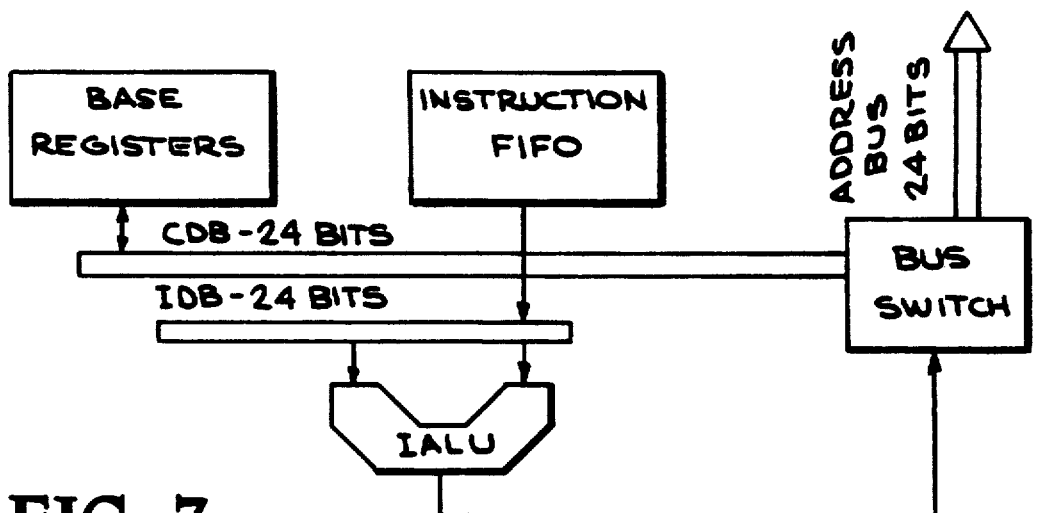
FIG. 7 is a block diagram of the elements of a signal processor which are used to calculate a starting address for a processor operation.

FIG. 7 shows the elements for a starting address calculation scheme. The operand can be a scalar (constant) or a vector whose elements can be accessed in blocks of consecutive samples. The data type of the operand, real or complex, is defined by the code option.

Literal Operands

Literal operands provide an immediate value to be used in data movement, floating-point arithmetic, and register instructions. The literal operand is treated as a 32-bit floating-point number or a 24-bit integer depending on the instruction type. Use of literal operand requires no external bus operations.

Internal Data RAM Organization

Figure 8:
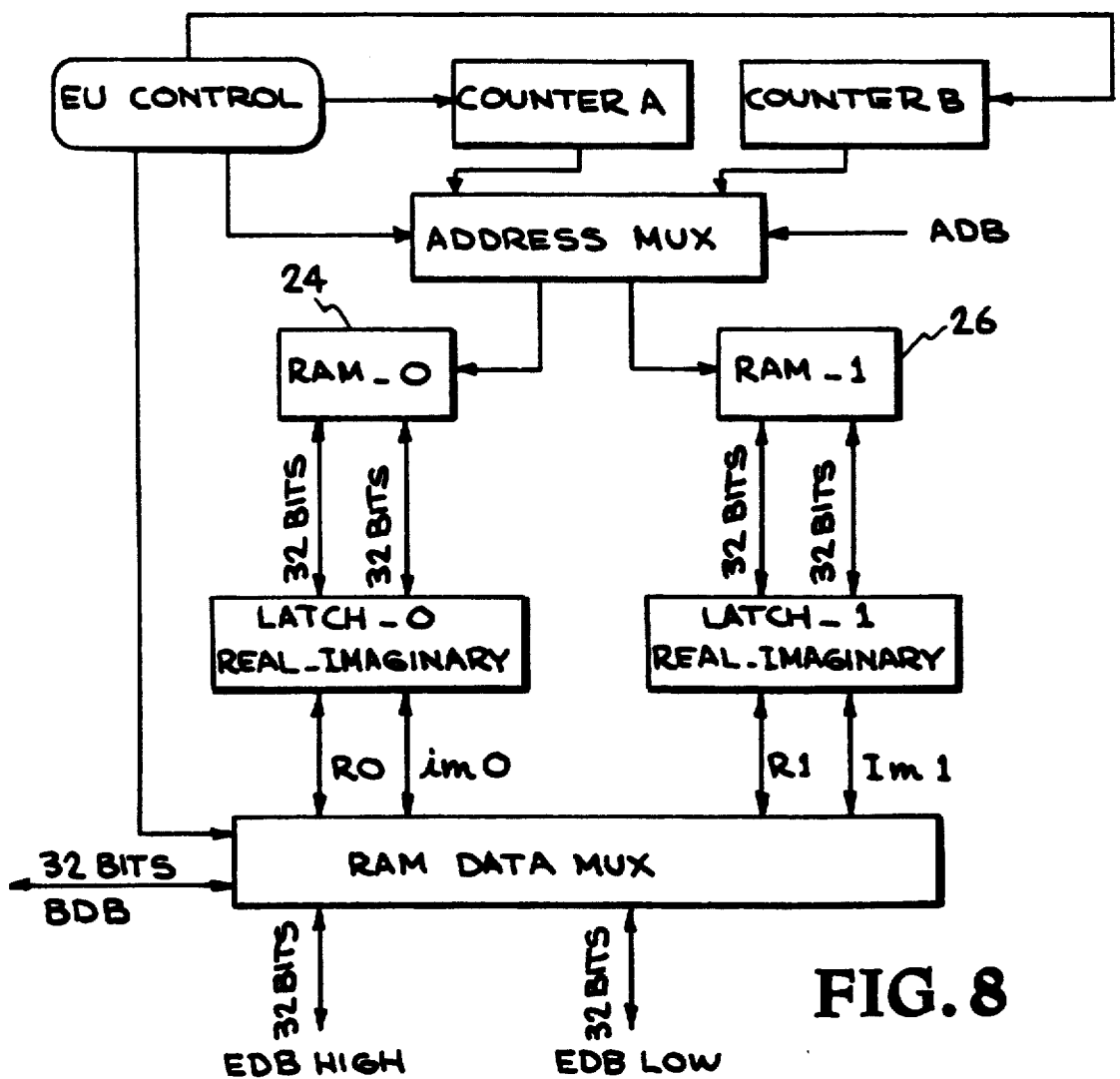
FIG. 8 is a block diagram of the elements of a signal processor which operate the internal RAMs.

FIG. 8 shows a functional block diagram of those elements of a vector signal processor which relate to operation of the internal RAMs 24, 26. The concurrent vector signal processor internal data RAM consists of 128 32-bit words organized as an array of 64 complex words. Each complex word consists of separate real and imaginary portions. The RAM can be used as a single array of 64 complex words or alternatively as two separate arrays each of 32 complex words. In the latter case the RAM operates in a dual-port fashion, allowing simultaneous accesses by the execution unit 12 and the move unit 14 to different sections. Internal operands can be complex vectors or real vectors. Real vectors may reside in the real or imaginary portion of the complex word. In single-memory operation, a block of variable size can be accessed. The starting location of the block is determined by an offset from the first address in the specified RAM section. To support FFT operation different modes of bit-reversal addressing are provided. The whole RAM or a specified RAM section can be cleared in one clock using an original circuit technique. The Data RAM is memory-mapped into the external address space starting at location OxO. Real and imaginary portions can be accessed using even and odd addresses respectively. Thus, internal memory can be directly read from and written to by other devices.

Internal Coefficient Lookup Table (CLUT)

The execution unit incorporates a coefficient lookup table (CLUT) 28. It is used in the FFT, IFFT, DFT, IDFT and DEMO instructions. The coefficient lookup table 28 contains 256 cosine values, which in conjunction with additional hardware, provide all of the coefficients required for implementation of FFTs with up to 1024 points. The coefficient lookup table 28 is memory mapped into the external address space and can be read (but not written) by an external device starting from address 0x300.

Arithmetic Registers

The execution unit 12 contains a 20-bit Min/Max Index register ($MNMXI) and three 32-bit registers: Real and Imaginary Accumulators ($ACC-R, $ACC-I) and Min/Max Value register ($MN-MXV). The accumulators ($ACC-R, $ACC-I) and the Min/Max registers ($MNMXI, $MNMXV) can be treated as a register pair. The two accumulators are effected by arithmetic instructions with complex operands; real operand instructions affect only one of the accumulators (e.g., MULT-C, FIR-C, IIR-C) and the Min/Max registers by the MIN and MAX instructions, which effect the content of the Min/Max Index register and the Min/Max Value register. These registers can be used in vector instructions that generate a scalar result such as Multiply and Accumulate or Vector Maximum or Minimum Search or a vector result in the filtering and matrix operations. All these registers are accessible by the control unit 18 and external devices. They can be stored to external memory as part of instruction execution by enabling the SAR mechanism as described in the next section.

Automatic Store of Arithmetic Registers (SAR)

When active, the SAR (Store Arithmetic Registers) mechanism writes register contents into the external memory just after the register is updated. This enables immediate use of the registers without a special store instruction.

Instructions that can activate the SAR mechanism are divided into two groups. In the first group the automatic store of arithmetic registers after update is optional (e.g. ACC, MULT, MGSQ, MIN and MAX). It is controlled by the SAR bit in the $MODE register and by the continuation option bit in each instruction for which the option applies. This option must be enabled in both the $MODE register and in the individual instruction to be active. Instructions from the second group (e.g. FIR, IIR, MTX, FMTX) exploit this mechanism independently of the setting of the SAR bit in the $MODE register.

Whenever the SAR mechanism is employed, an initial address for the result must be loaded into the $SAR Counter. Once activated, the SAR mechanism stores one or both Accumulator registers or the Min/Max Index and Value registers in accordance with the executed instruction. The $SAR counter is incremented by the number of stored registers.

Figure 9A:
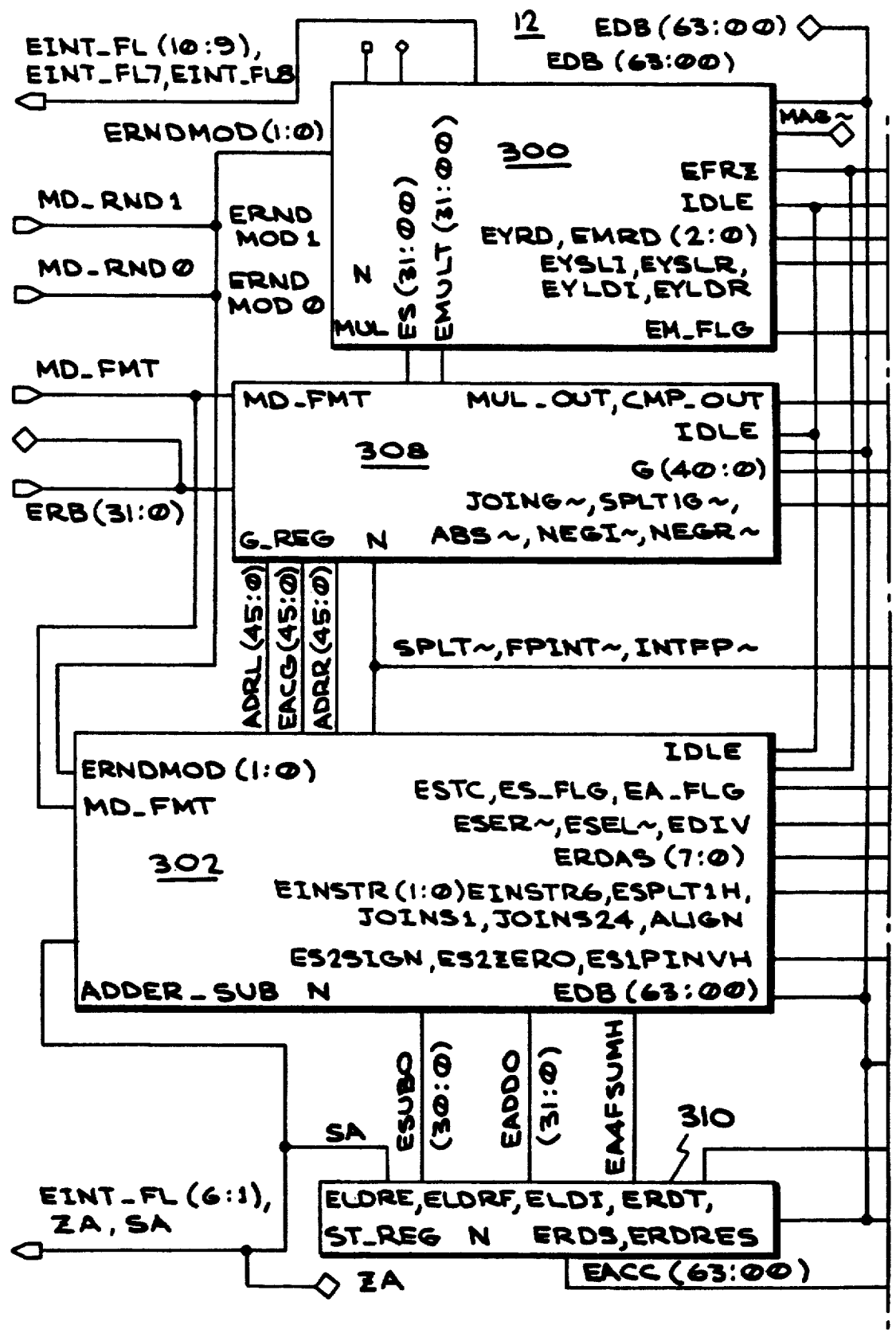
FIGS. 9A-9C are schematic block diagrams of an execution unit.
Figure 9B:
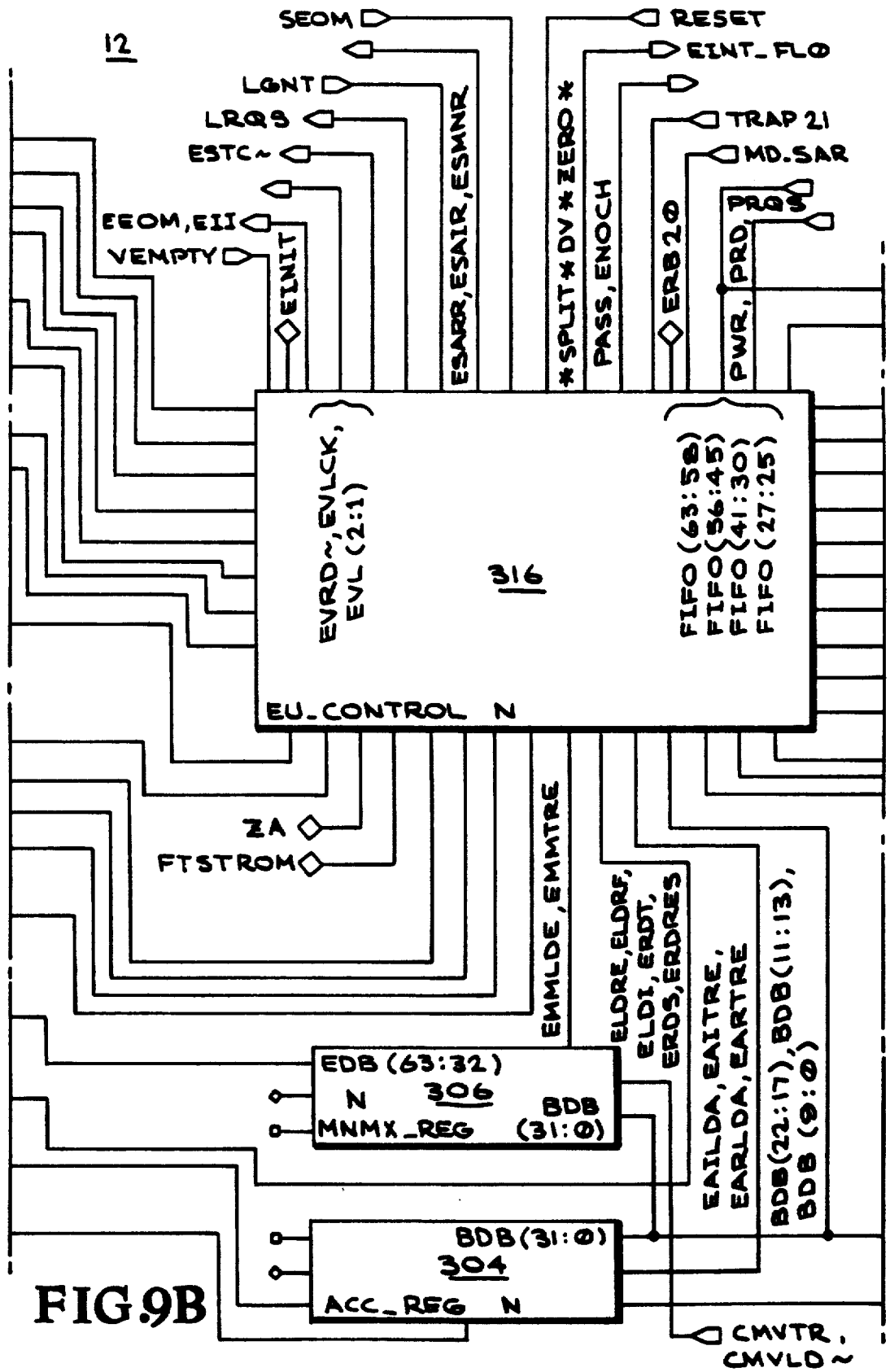
Figure 9C:
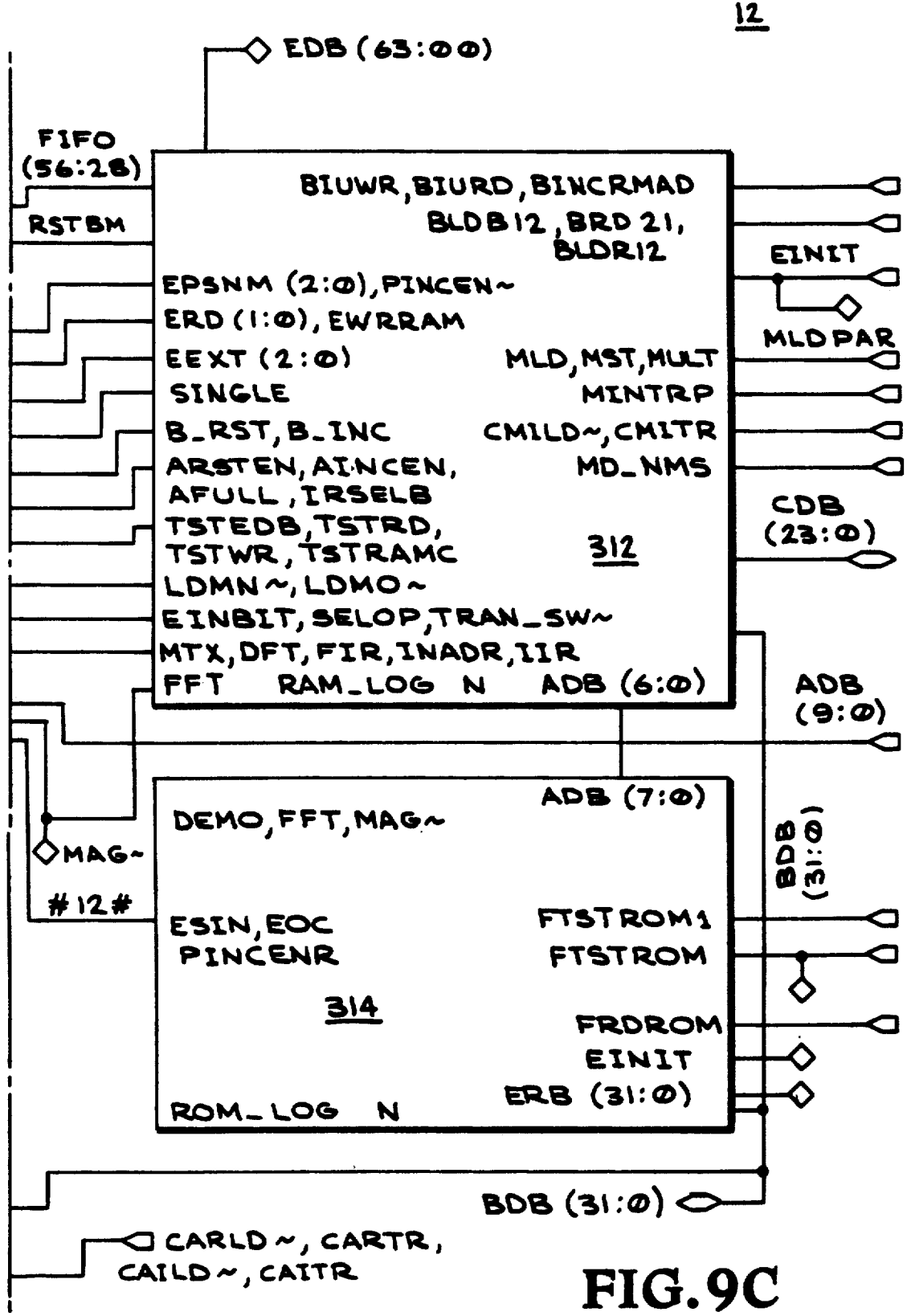

FIG. 9 shows the EU 12 which is a processing unit that performs all floating-point arithmetic operations. It comprises three computation blocks: Multiplier (Mult 300), Adder-Subtracter and Adder (combined in Adder-Sub 302). In addition to three arithmetic registers Acc-Reg 304 and Mnmx-Reg 306 there are auxiliary registers G-Reg 308 and ST-Reg 310 used for temporary storage of operands and results. Internal vector operands reside in the internal RAM (RAM-Log 312). Trigonometric operands required by some instructions are stored in the coefficient look-up table (ROM-Log 314).

The control of the EU is provided by the EU-Control 316, which supports repetitive operations of the computation blocks on elements of vector operands. In accordance to an instruction requirements the EU-Control 316 determines a proper configuration of the EU data path.

The EU blocks are interconnected by 64-bit data bus EDB (63:0), capable of transferring one complex or two real words in one instruction cycle, and 32-bit data bus ERB (31:0) for operand transfer from the VU, FU or ROM to the G-Register. 32-bit data bus BDB (31:0) is used for data transfers to/from the internal RAM and arithmetic registers. It also serves for test reads of the EU registers.

Multiplier

Figure 10:
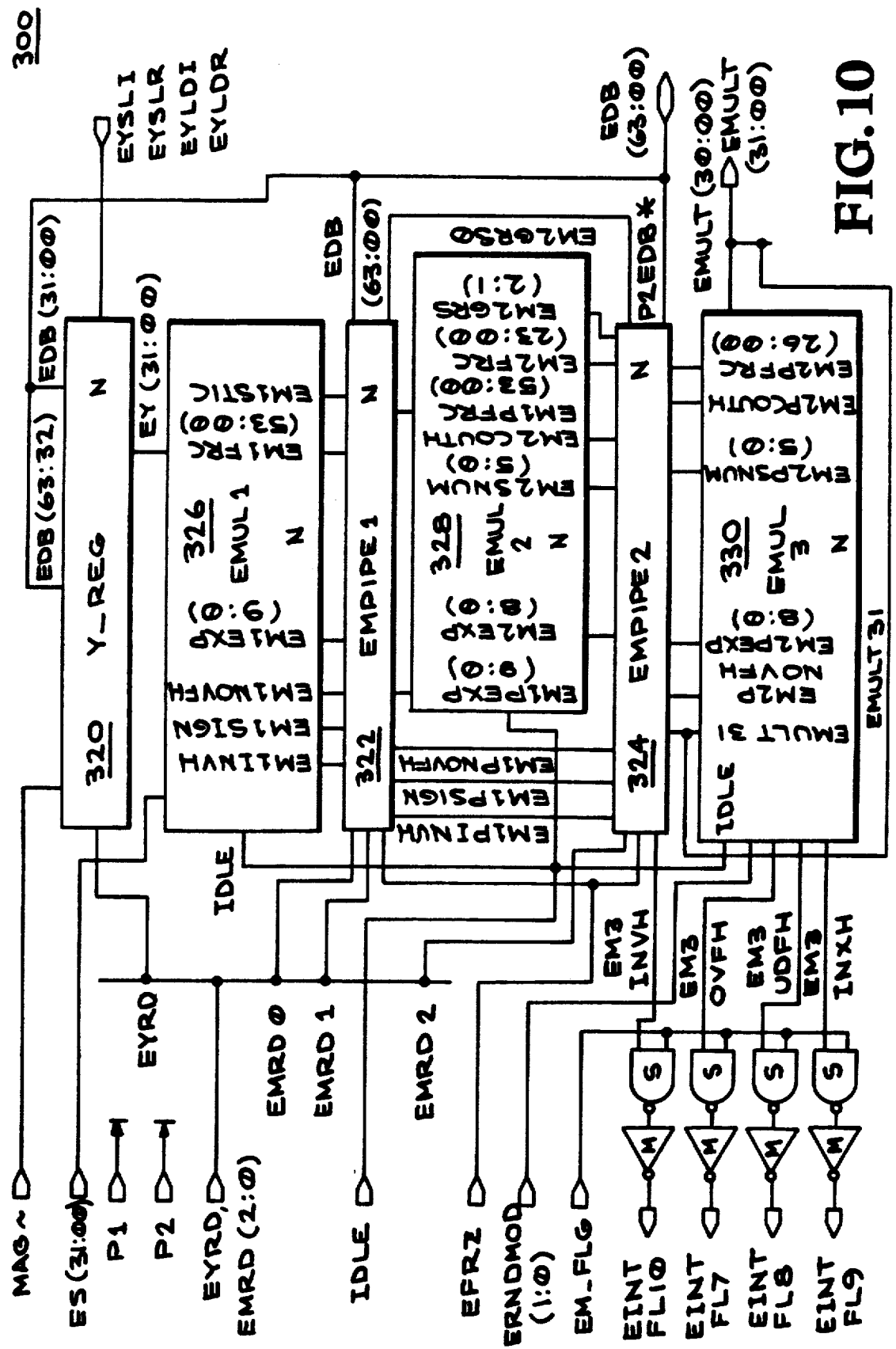
FIG. 10 is a schematic block diagram of a multiplier unit.

FIG. 10 shows the ZR34325 multiplier 300 which has a pipeline architecture that allows to provide one product of floating-point multiplication, complying with IEEE Standard 754-1985, every instruction cycle. The first operand, real or complex, is latched into the Y-Register 320 from EDB, while the second is latched into the G-Register 308 from ERB or EDB.

The multiplication is performed in three phases with storage of intermediate results in the pipelines Empipel 322 and Empipe2 324 and final product in the G-Register 308.

In the first stage Emul1 326 the following functions are executed:
  Add exponents
  Detect exceptions
  Find sign of the product
  Start multiplication of the fractions - 24 by 24 bits hardware multiplier utilizes 4-bit Booth algorithm and Wallace tree.

The second stage of the multiplier Emul2 328 completes multiplication of the fractions, detects leading zeroes in the fraction product, updates the exponent results and finds a number of shift to be performed on the fractions product.

In the third stage Emul3 330 the fractions product is shifted, if required, and rounded in accordance to the selected rounding mode. As a result of rounding the resultant exponent could be incremented. If a special representation (e.g., infinity) is required, the result is forced to proper values of fraction and exponent. The four exception flags are synchronized with the result.

Adder-Subtracter

Figure 11A:
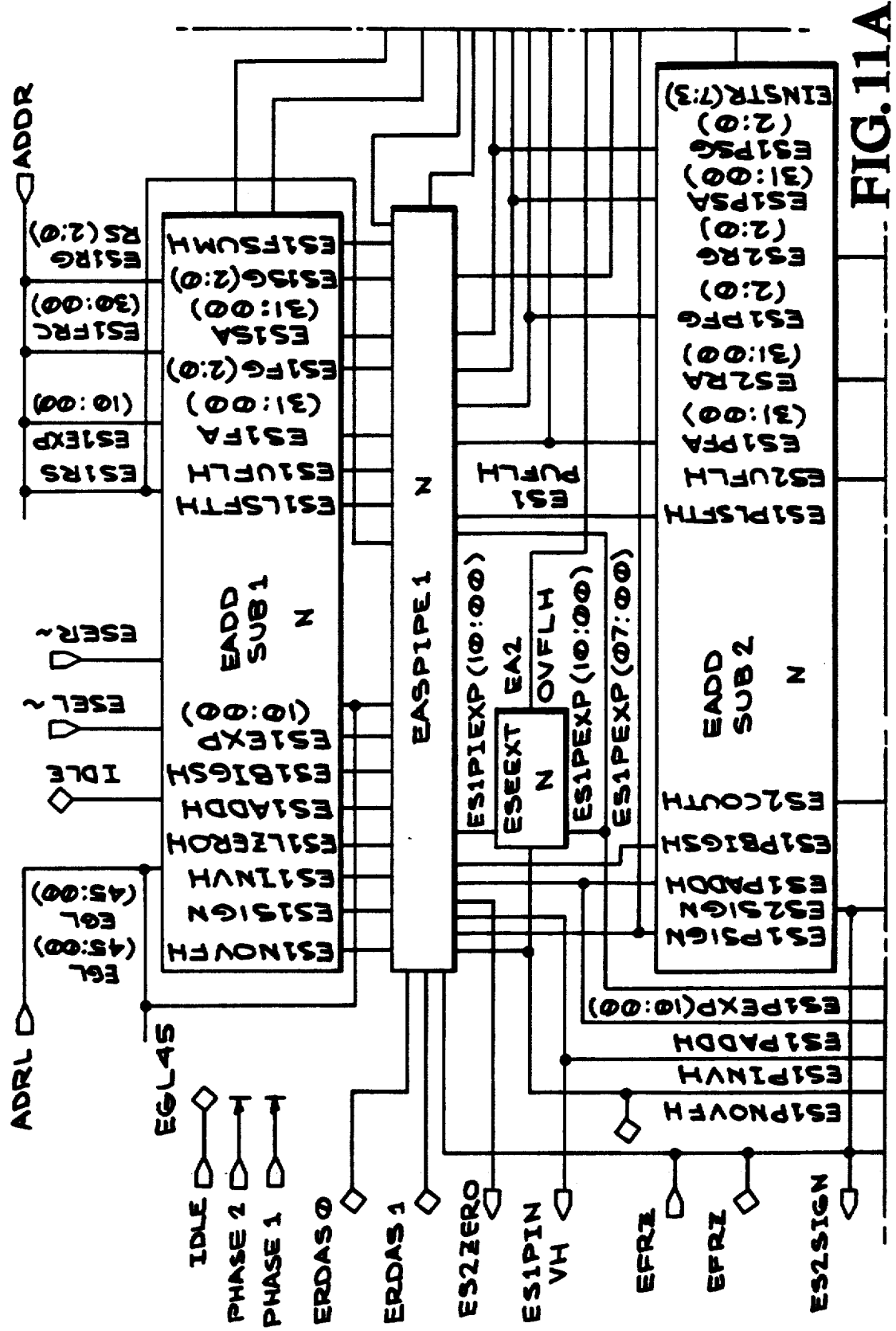
FIGS. 11A-11C are shematic block diagrams of an addersubtracter unit.
Figure 11B:
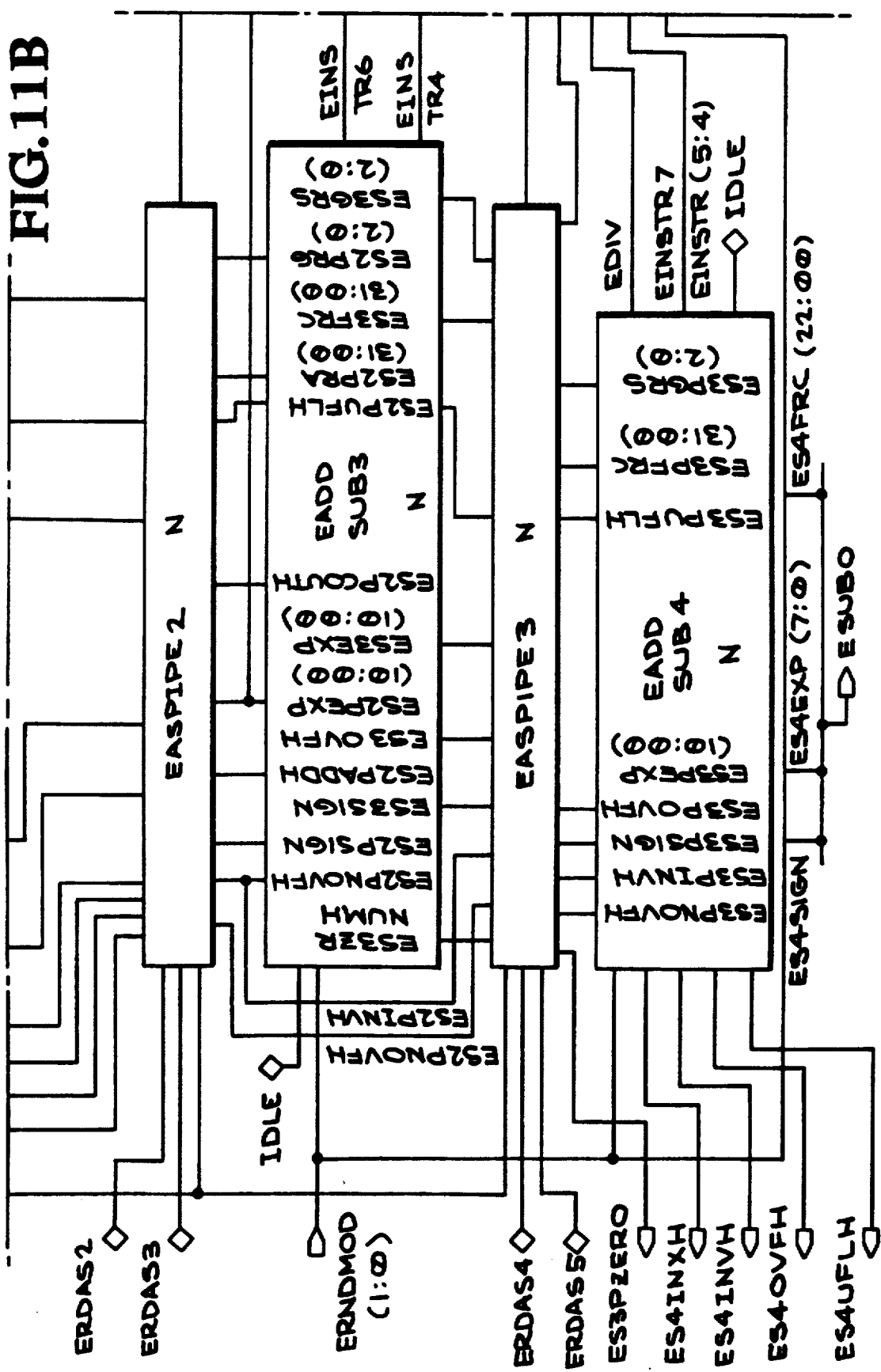
Figure 11C:
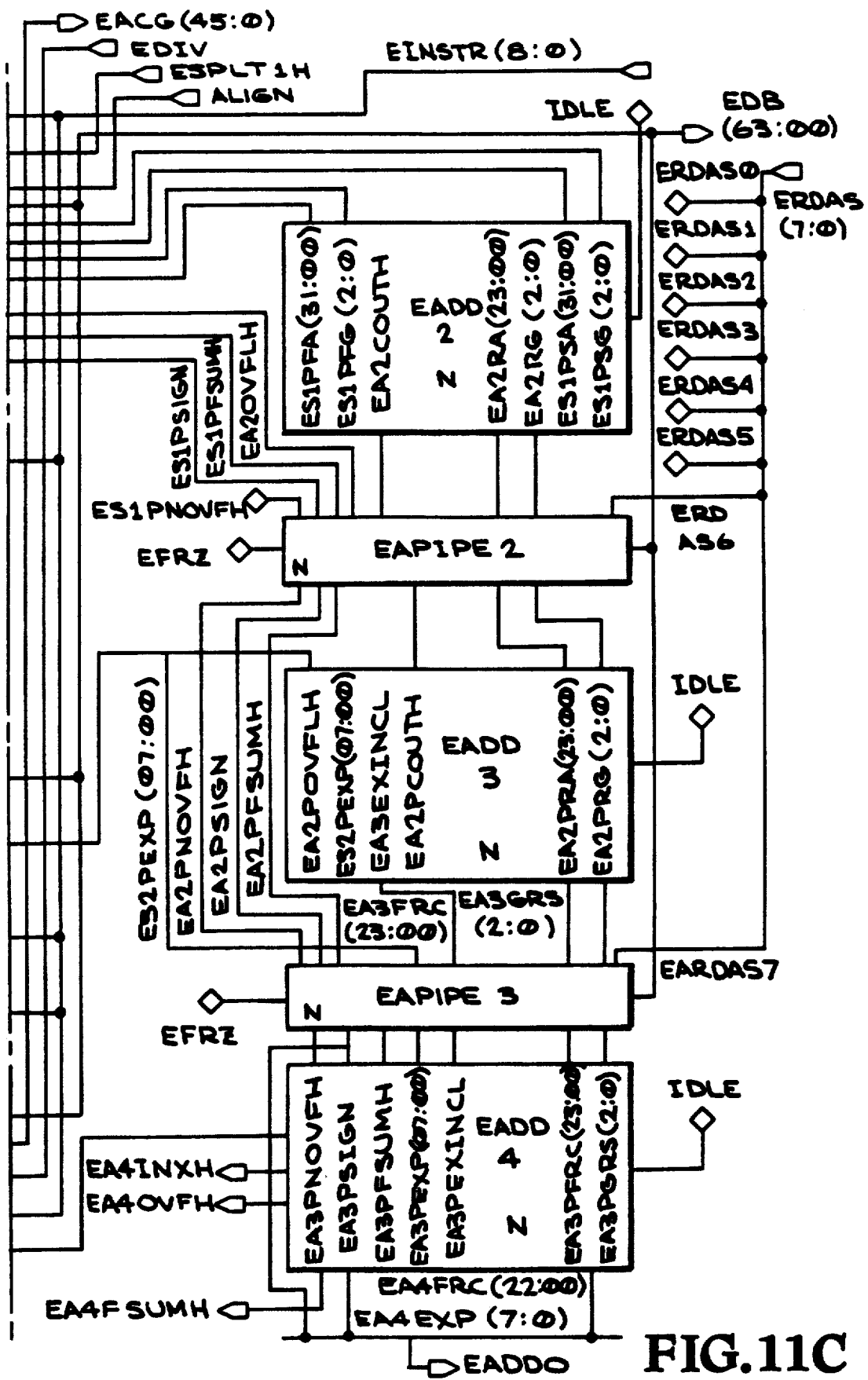

FIG. 11 shows the ZR34325 Adder-Subtracter 302 which provides simultaneously the sum and difference of two floating-point operands according to the IEEE Standard 754-1985. The unit has a pipeline architecture. The operands, real or complex, are latched into the G-Register from EDB and/or ERB.

The operation is performed in four phases with storage of intermediate results in the pipelines Easpipel, Easpipe2, Easpipe3 and Eapipe2, Eapipe3. The results, sum and difference, are latched into the ST-Register.

In the first stage Eaddsub1 the following functions are executed:
  Subtract exponents
  Detect exceptions
  Find sign of the result
  Align fractions by shifting one with smaller exponent to the right.

The second stage Eaddsub2 performs:
  Addition or subtraction of fractions
  Detection of underflow
  Negation of sign of the result, if required by operation.

In the third stage Eaddsub3 the difference of fractions is normalized (shifted to the left by a number of leading zeroes) and the exponent is updated (decremented by the same number). In the case of addition the sum of fractions could require a right shift by one to avoid overflow. Again, the exponent will be updated.

The first three stages of the Adder-Subtracter operate in extended format (44 bits as defined by the standard). If result of the operation (sum or difference) is used as an operand for next operation (e.g., accumulation) it bypasses the fourth stage and is latched into the G-Register in the extended format.

The fourth stage Eaaddsub4 rounds the result of the 32-bit format in accordance with selected rounding mode. It generates exception flags and forces proper values for resultant exponent and fraction if required.

The Adder operates on two operands already aligned in the Eadsubl. Adder stages are responsible for the following operations:
  Eadd2—summation
  Eadd3—postnormalization
  Eadd4—rounding and exception flags generation.

Acc-Register

The EU includes two 32-bit accumulators, which can be operated on as two independent real registers or one complex register in accordance to instruction operands type. The registers can be accessed by the EU through EDB bus and by the CU or external device via BDB bus. The accumulation results are copied from the ST-Register using EACCC (63:0) bus.

Mnmx-Register

The ZR34325 performs Search Minimum/Maximum operations that utilize Mnmx Index and Value registers. The Mnmx Index register resides in the RAM-Log 312, while the Mnmx Value register is a separate block similar to accumulators. It can be accessed by the EU through EDB bus and by the CU or external device via BDB bus.

ROM-Logic

The ROM-Logic unit 314 is used by instructions in which one of the operands is a trigonometric function (sin or cos), like FFT, DEMO and others. It consists of address generator ROM-Add and look-up table ROM. The former provides an appropriate address for the coefficient look-up table, determined by instruction fields RBA, RIA, R and l. The RBA value can be loaded and incremented in run-time.

The coefficient look-up table consists of 256 cosine values that with a proper addressing provide twiddle factors for a 1024-point complex FFT. The ROM includes decoder and data buffer. It can be accessed by the EU during instruction execution or by an external device.

RAM-Logic

Figure 12:
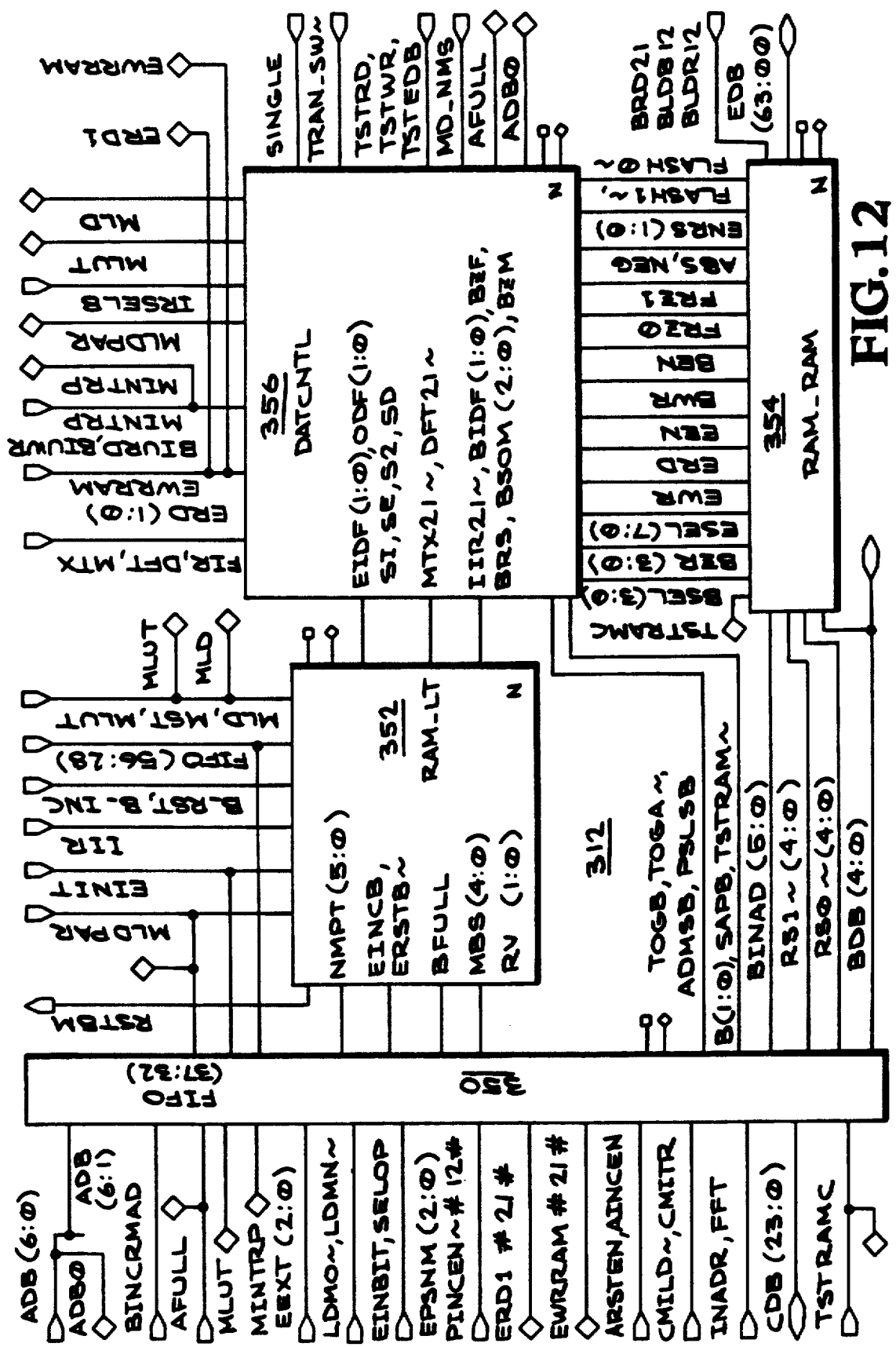
FIG. 12 is a schematic block diagram of a ram logic unit.

FIG. 12 shows the RAM-Logic 312 which consists of four functional blocks. There is a powerful address generator RAMADD 350 capable to provide independent addressing to two RAM Sections when both the EU and MU operate concurrently. The MU controls counter B, when the EU can gain control on counter A and B, if required by operation. For FIR instruction a sum of two counter's values is used as an address. A proper address source for each section is selected by the Addselect. The instruction parameters that affect RAM operation are latched into the RAM-Lt 352. The RAM matrix, including two decoders and data buffers/multiplexers, is denoted as RAM-RAM 354. The schematic representation is identical to the one used in layout verification and has only peripheral cells in order to reduce CPU time. A special function, activated by FLASH0 and FLASH1 signals, allows to clear a specified RAM Section prior to vector load. The RAM-bus interface is handled by the DATCNTL 356 which selects operands to be transferred to EDB or BDB and results to be written from these buses to the RAM. The hardwired zero is used for interpolation and for clearing imaginary part of complex word.

EU-Control

Figure 13A:
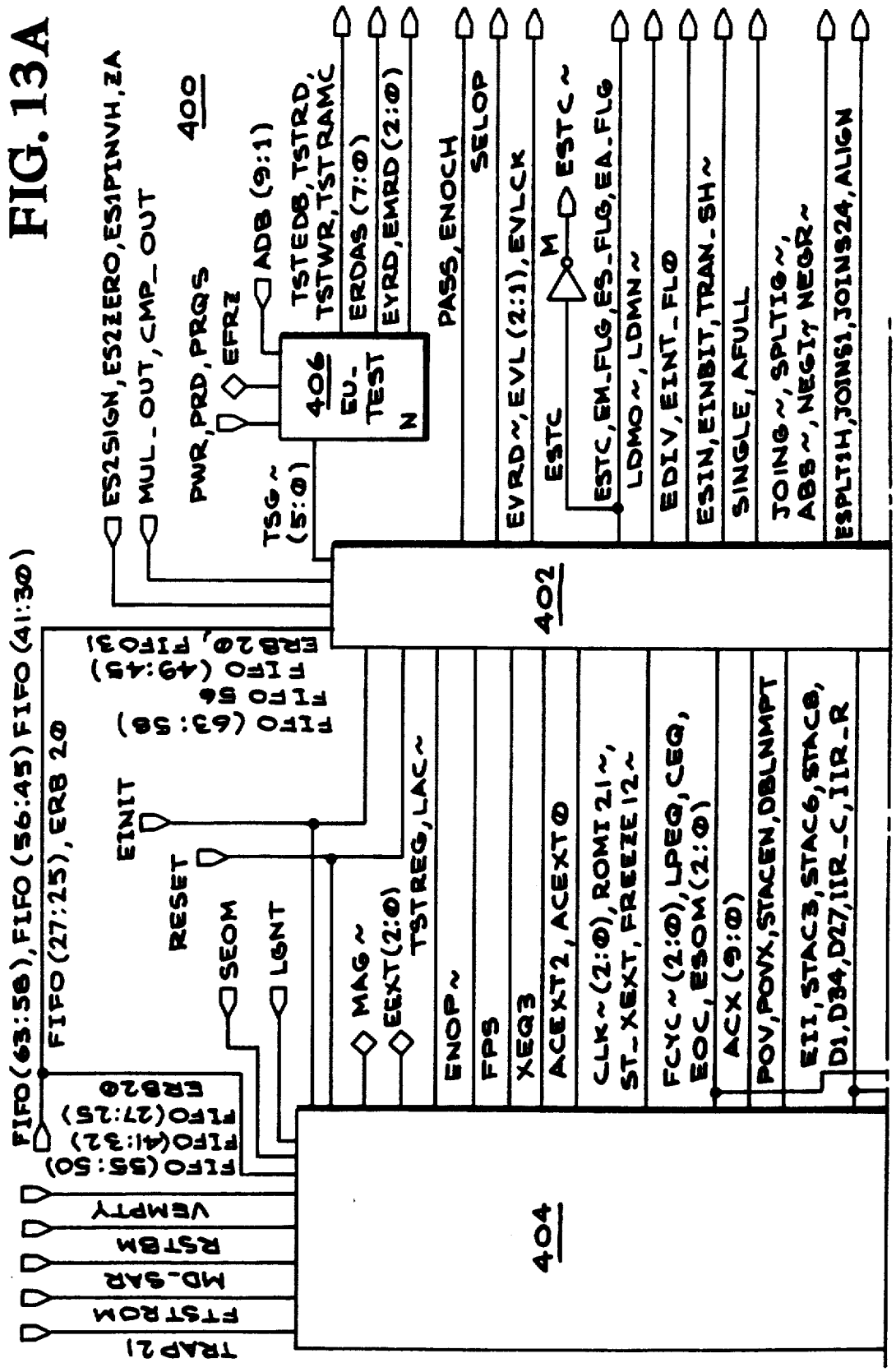
FIGS. 13A-13B are schematic block diagrams of an EU control unit.
Figure 13B:
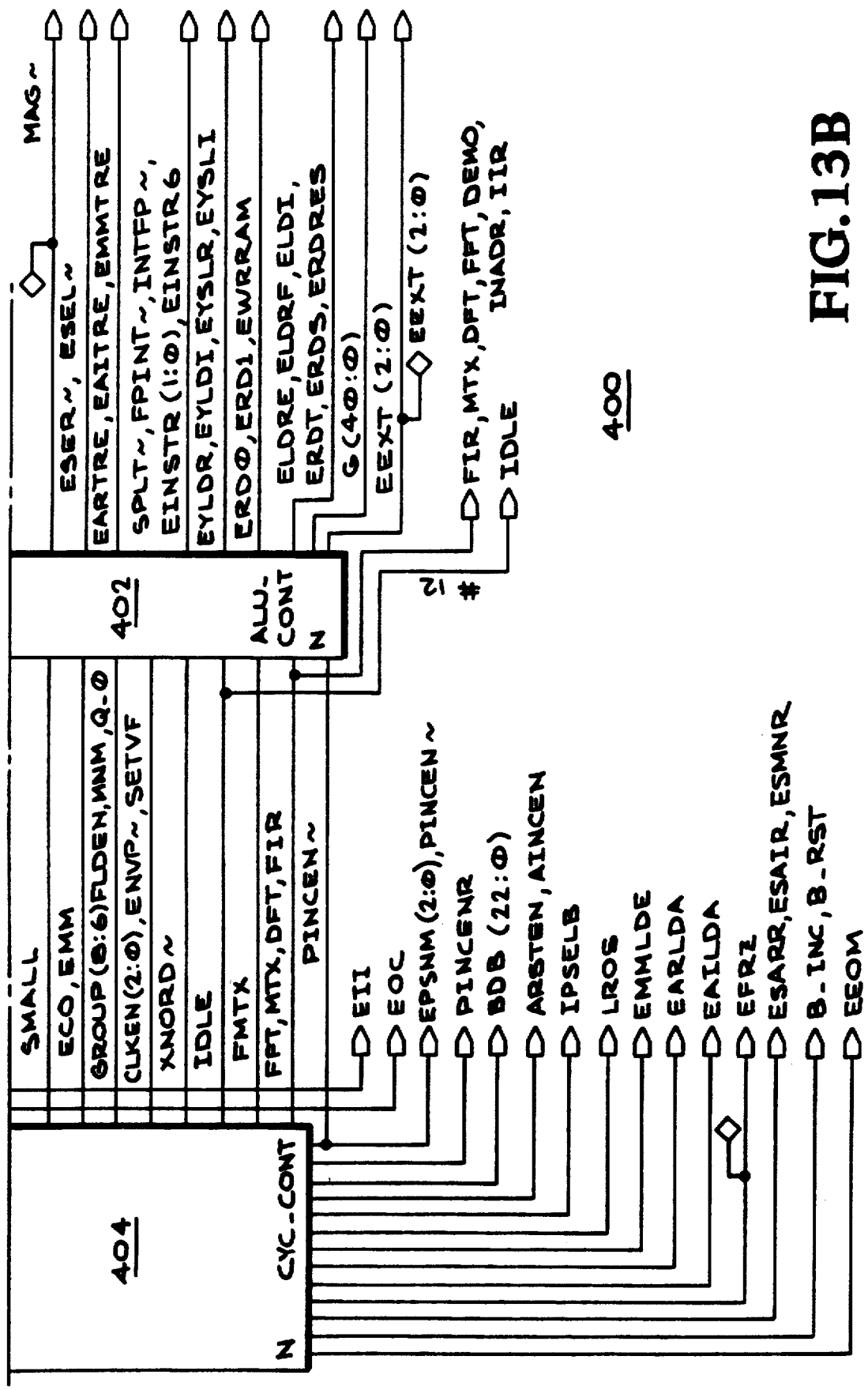

FIG. 13 shows the control 400 for the EU which is divided between two blocks: ALU control ALU-Cont 402 and cycle control Cyc-Cont 404. The EU-Test 406 provides addressing for test access of the EU registers by an external device.

Figure 14A:
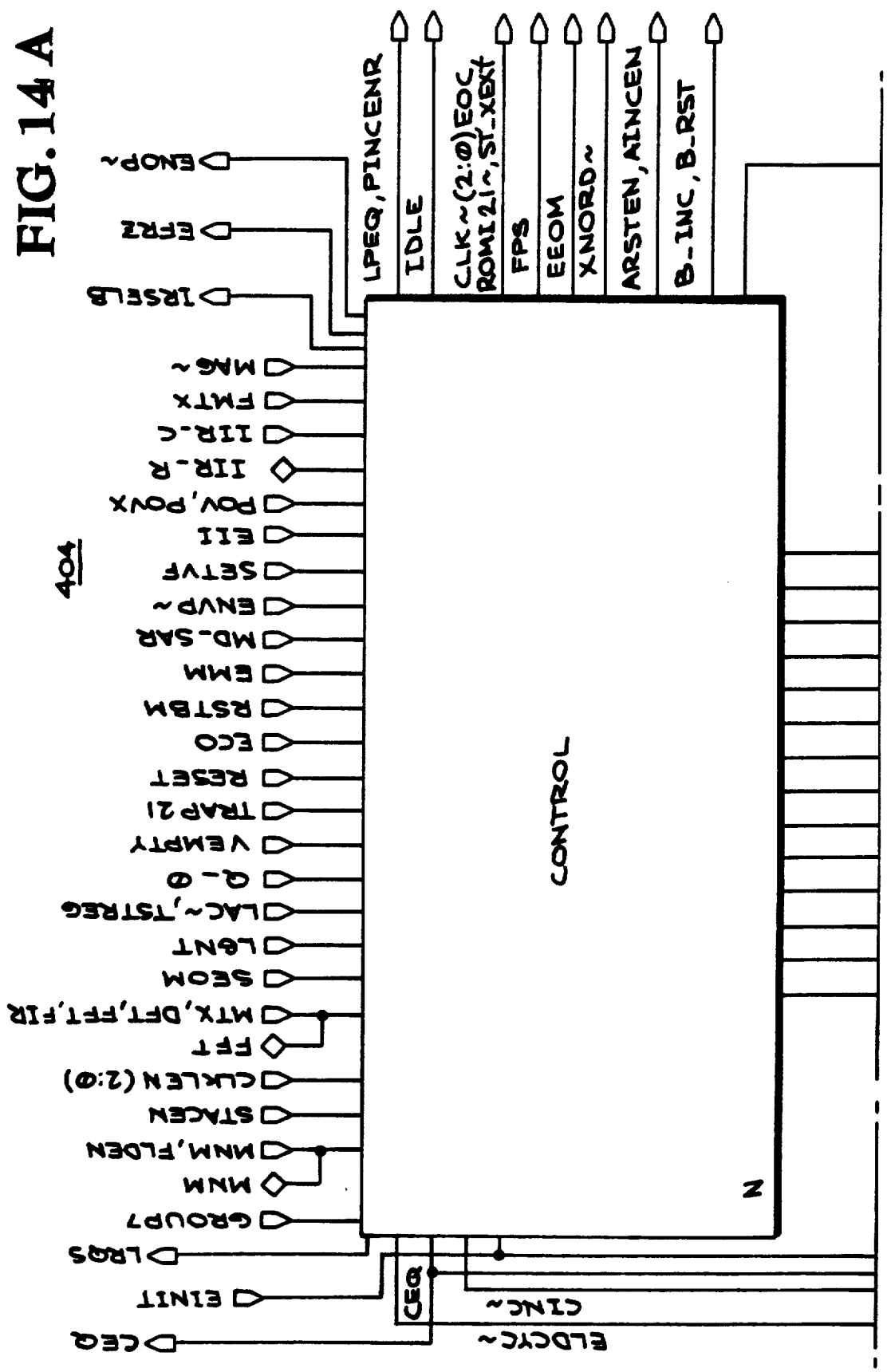
FIGS. 14A-14B are schematic block diagrams of a cycle control unit.
Figure 14B:
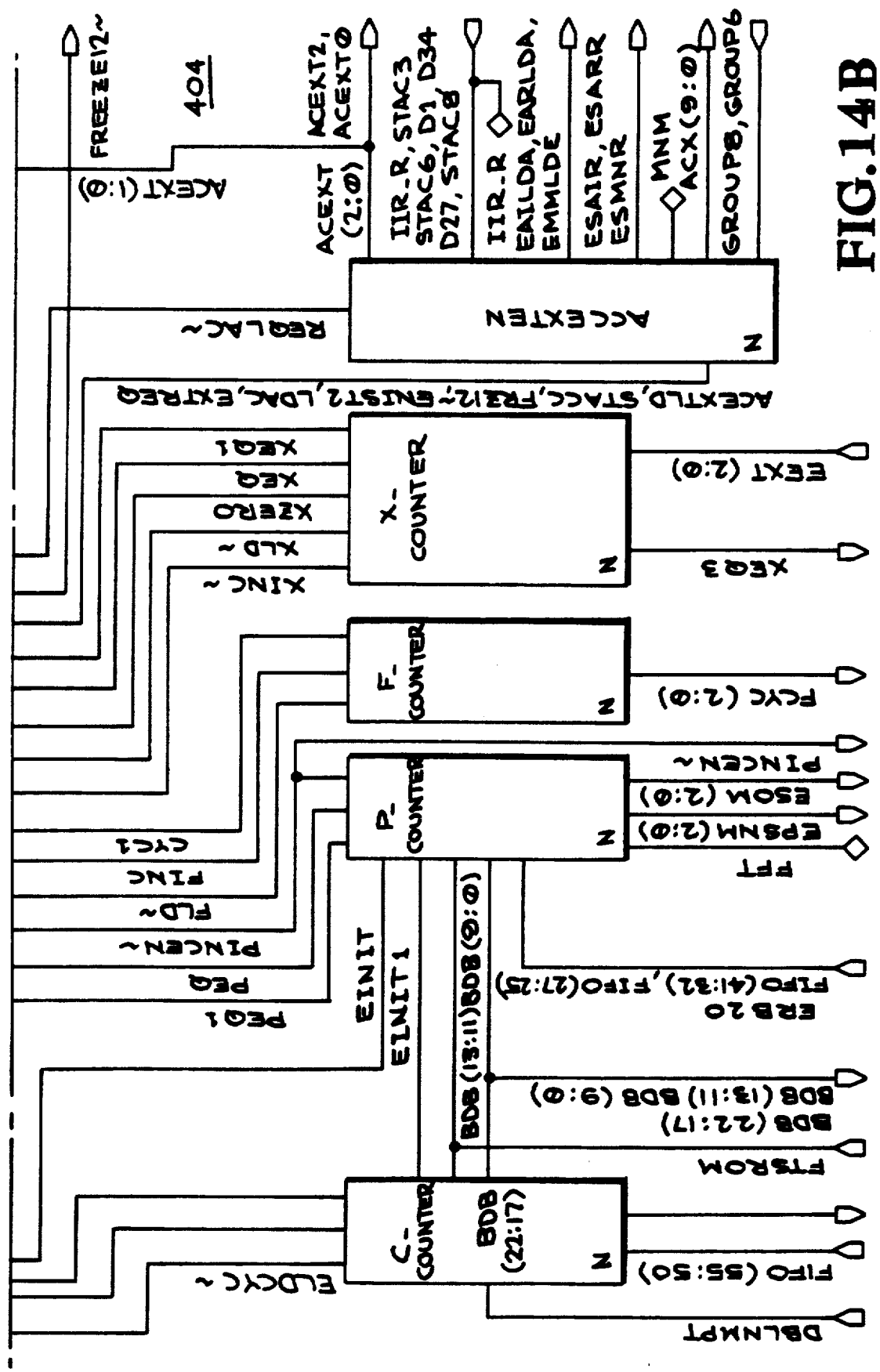

FIG. 14 shows the cycle control including Cyc-Cont 404 which consists of the following building blocks:

- C-Counter—counts a number of points in the vector operand;
- P-Counter—counts a number of repetitions of the vector operand use;
- X-Counter—counts a number of extension cycles determined by datapath pipeline latency, which varies for different instructions;
- F-Counter—counts first 'special' cycles of the instruction in order to initiate the datapath pipeline;
- Accexten—shift register which provides control of the Adder-Subtracter and arithmetic registers at the final stage of accumulation and search for extreme points;
- Control—incorporates multiple PLAs and combinatorial logic and provides control for the counters and handles interface with ALU control and other units.

Figure 15A:
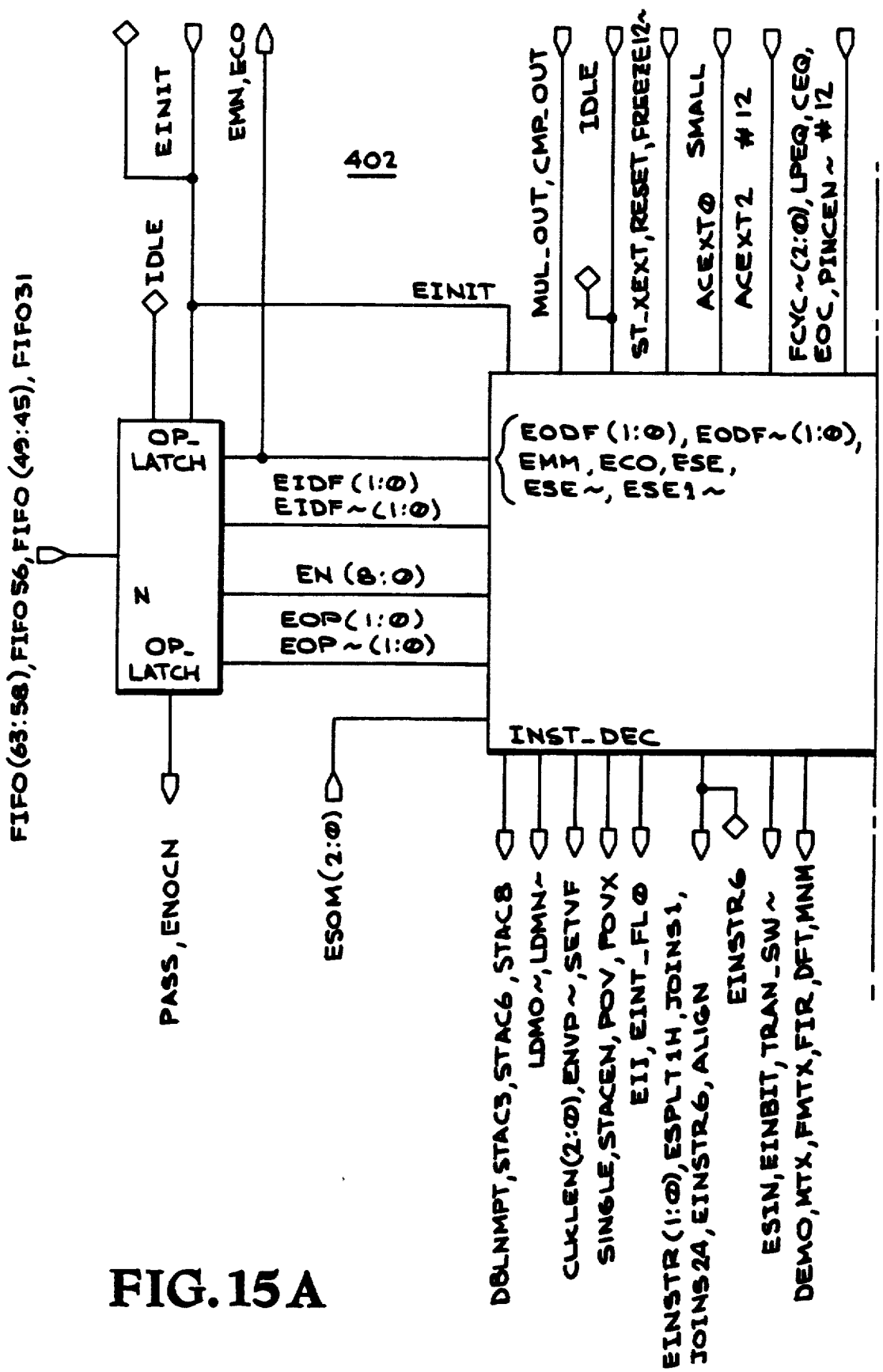
FIGS. 15A-15B are schematic block diagrams of an ALU control unit.
Figure 15B:
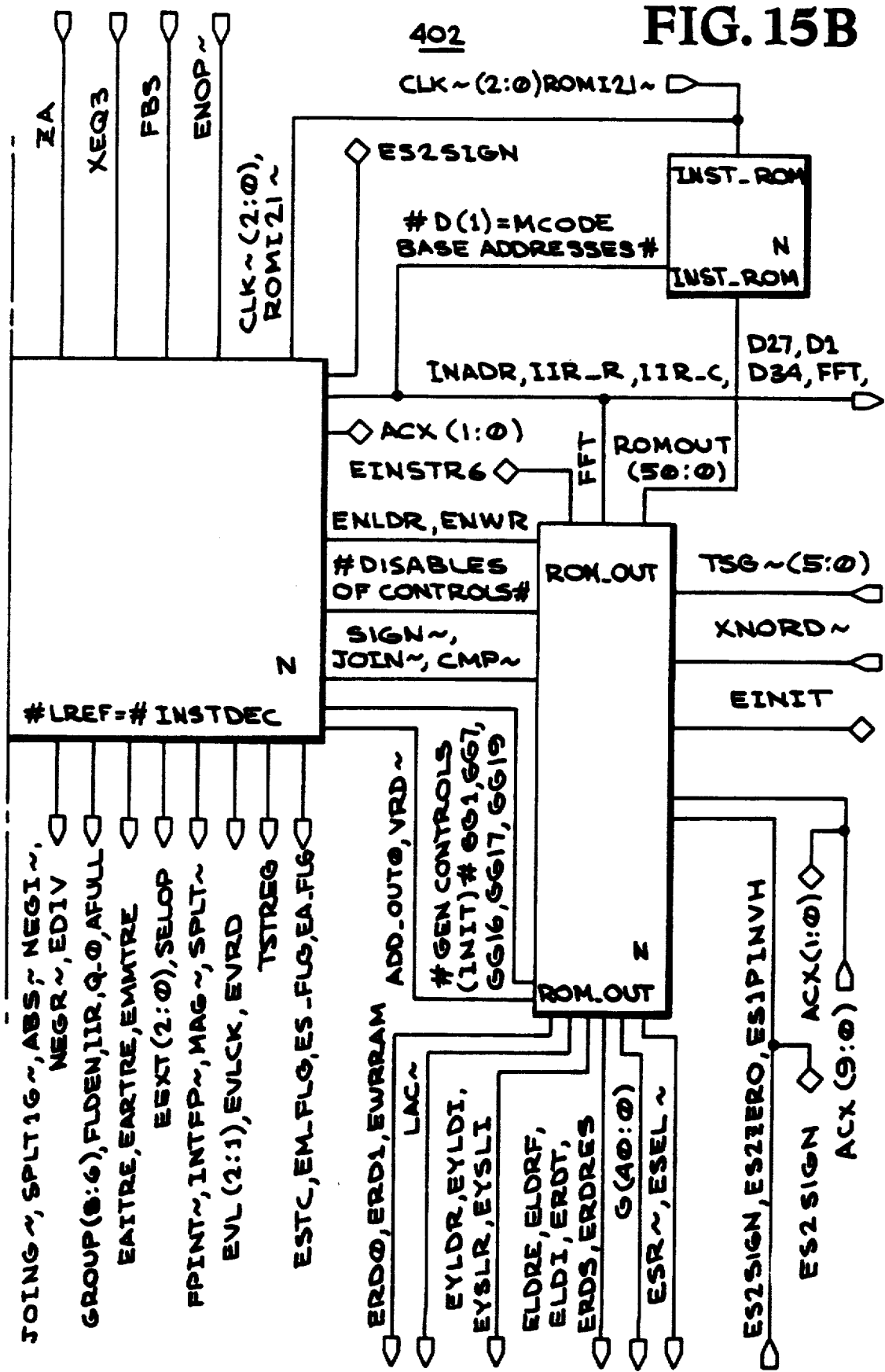

FIG. 15 shows the ALU control 402 which includes four blocks:

- Op-Latch—latches instruction parameters from the FIFO bus.
- Inst-Dec—consists of opcode decoder, disable logic and general logic and provides addressing to microcode ROM and control signals in accordance to instruction type;
- Inst-ROM—microcode ROM with 51-bit instruction word;
- ROM-Out—provides a proper timing for microcode outputs that control G-Register, Y-Register, ST-Register and RAM.

Vector Buffer Unit

Figure 16:
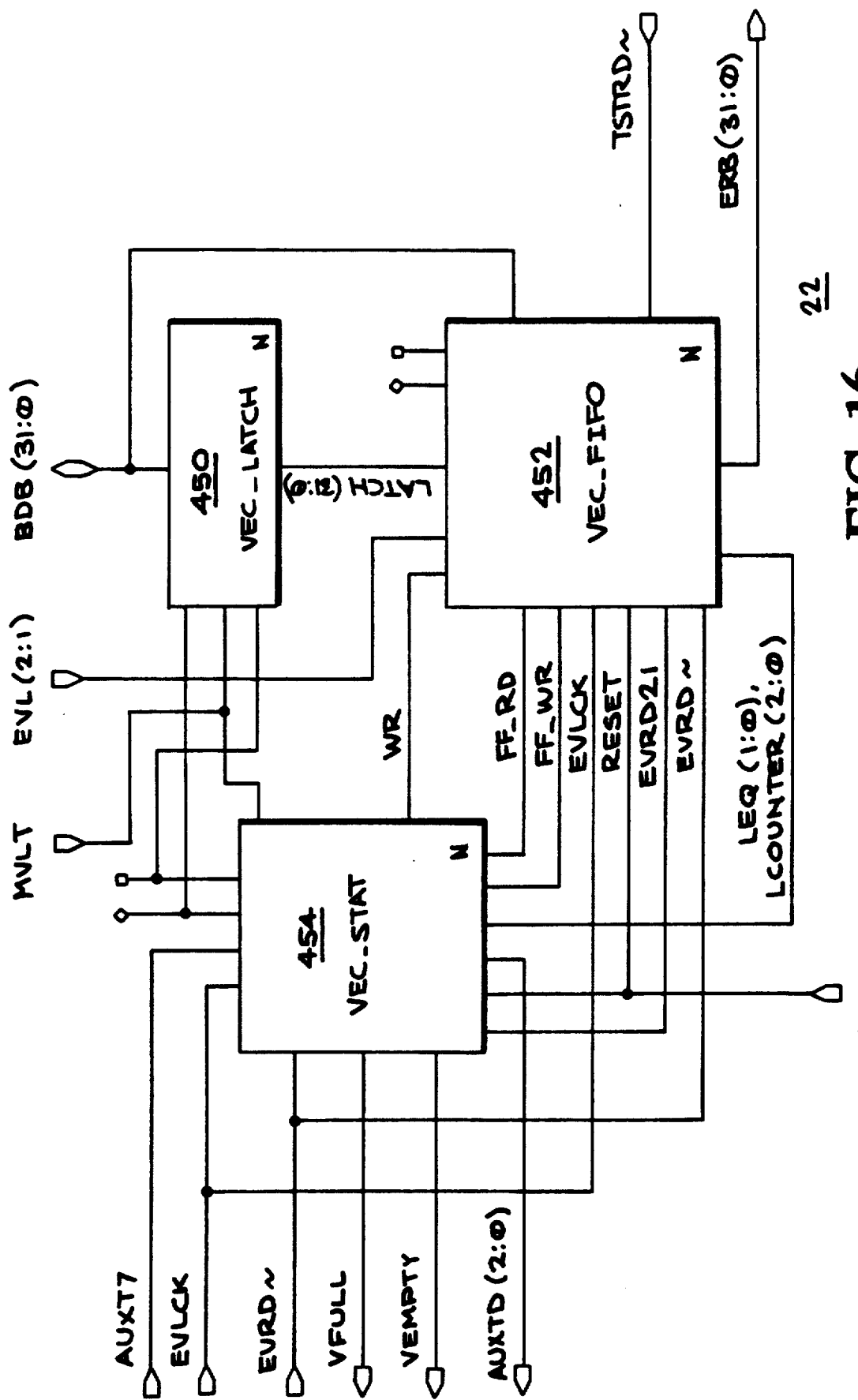
FIG. 16 is a schematic block diagram of a vector buffer unit.

FIG. 16 shows the vector buffer unit 22. The execution unit 12 does not have direct access to external memory. When instructions which involve operations on external data are executed, the move unit 14 is employed to fetch an external operand into the vector unit 22. The vector unit 22 contains a four word FIFO (each word is 32 bits wide), a control block (which provides the handshake between the execution unit 12 and the move unit 14 with a lock mechanism. The lock mechanism is used in operations between an external constant and an internal vector and in the Fast Matrix Multiply instruction. The vector unit 22 decouples the execution unit 12 from the external bus, thus reducing the influence of the bus on processor performance.

The VU 22 is used as a Fifo buffer for arithmetic instructions with external operands in order to decouple the EU from the external bus. Similarly to the Fetch Unit, the VU consists of Vec-Latch 450, Vec-Fifo 452 and Vec-Stat 454. The external operand is loaded into the Vec-Latch 450through the BDB (31:0) and copied to the Vec-Fifo 452 if empty slots are available. The data is transferred to the EU on the ERB (31:0) when EVRD signal is asserted. The data fetch is controlled by the MU through the MVLT line. The availability of the slots is controlled by the Vec-Stat 454. It also supports a lock mode of the Vec-Fifo when EVLCK is active. In that case a repetitive read operation of the same data (the number of data points can vary from one to four) is performed.

Control Unit

As shown in FIG. 1, the concurrent vector signal processor control unit (CU) 18, which is composed of a 24-bit integer ALU IALU 52 and a barrel shifter 50, and which supports addressing computations and register operations. A set of arithmetic and logical operations can be executed on internal control registers 30 or internal address registers 32, or on external memory. The results are written into the specified register(s). The control unit 18 also provides register transfer operations and supports external stack operations.

Control Register Unit

Figure 17:
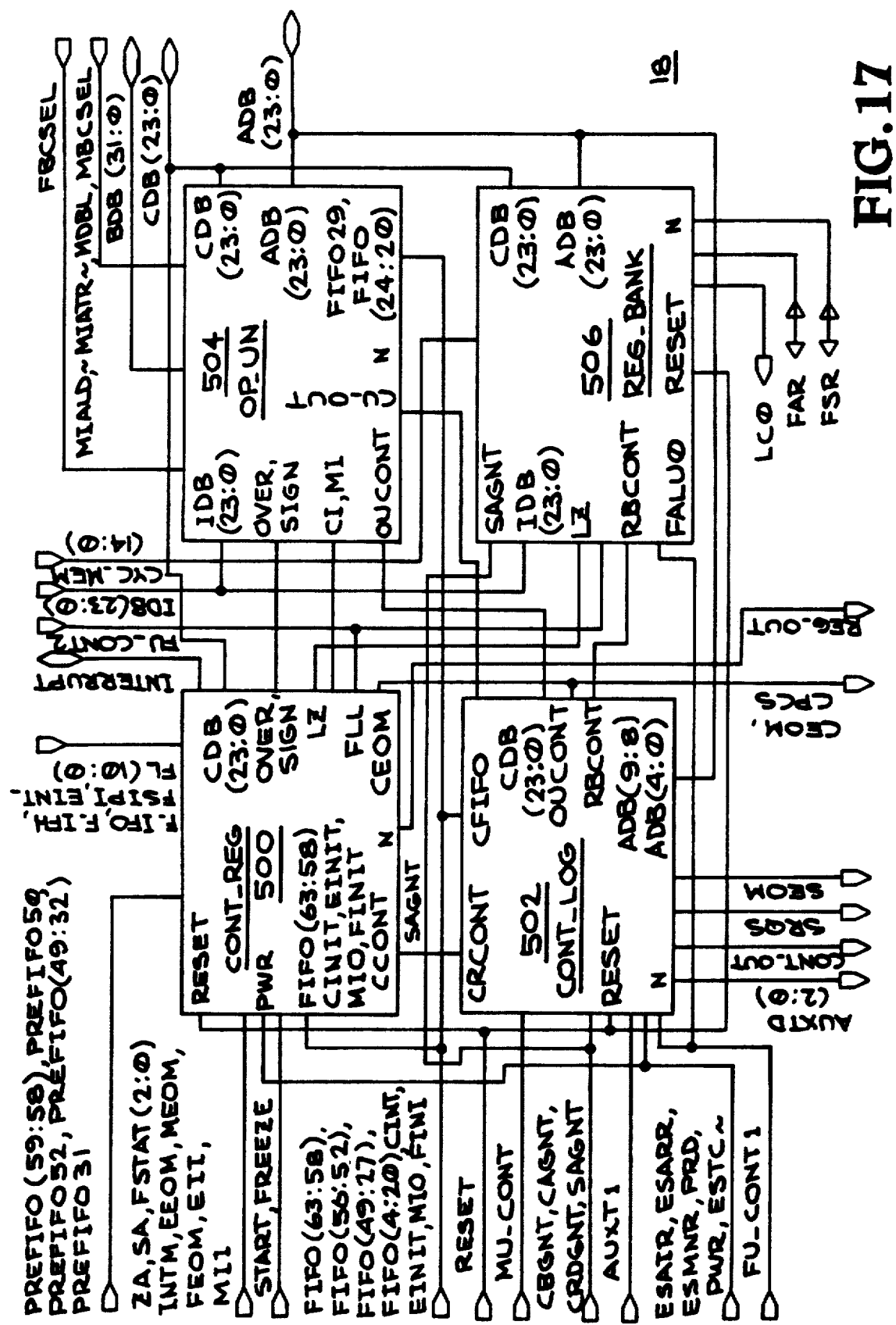
FIG. 17 is a schematic block diagram of a register control unit.

FIG. 17 shows the CU 18 which performs register operations including integer arithmetic and register transfers. It comprises four blocks: Cont-Reg 500 are control registers that determine operation mode and hold current status information; Cont-Log 502 contains CU control logic, that includes state machine and other control circuitry to support register operations; Op-Un 504 is an operation unit executing all 24-bit integer arithmetic and logic operations (see FIG. 18), and Reg-Bank 506 is a register file that consists of address and general 24-bit registers.

Communication inside and outside the CU is provided on CDB (23:0), IDB (23:0) and BDB (31:0) data buses and ADB (23:0) address bus. The control signals are grouped according to their origin and destination (e.g., MU-CONT). A type of operation to be executed by the CU is determined by instruction fields, transferred through FIFO (63:0) bus.

Control Registers

Figure 19A:
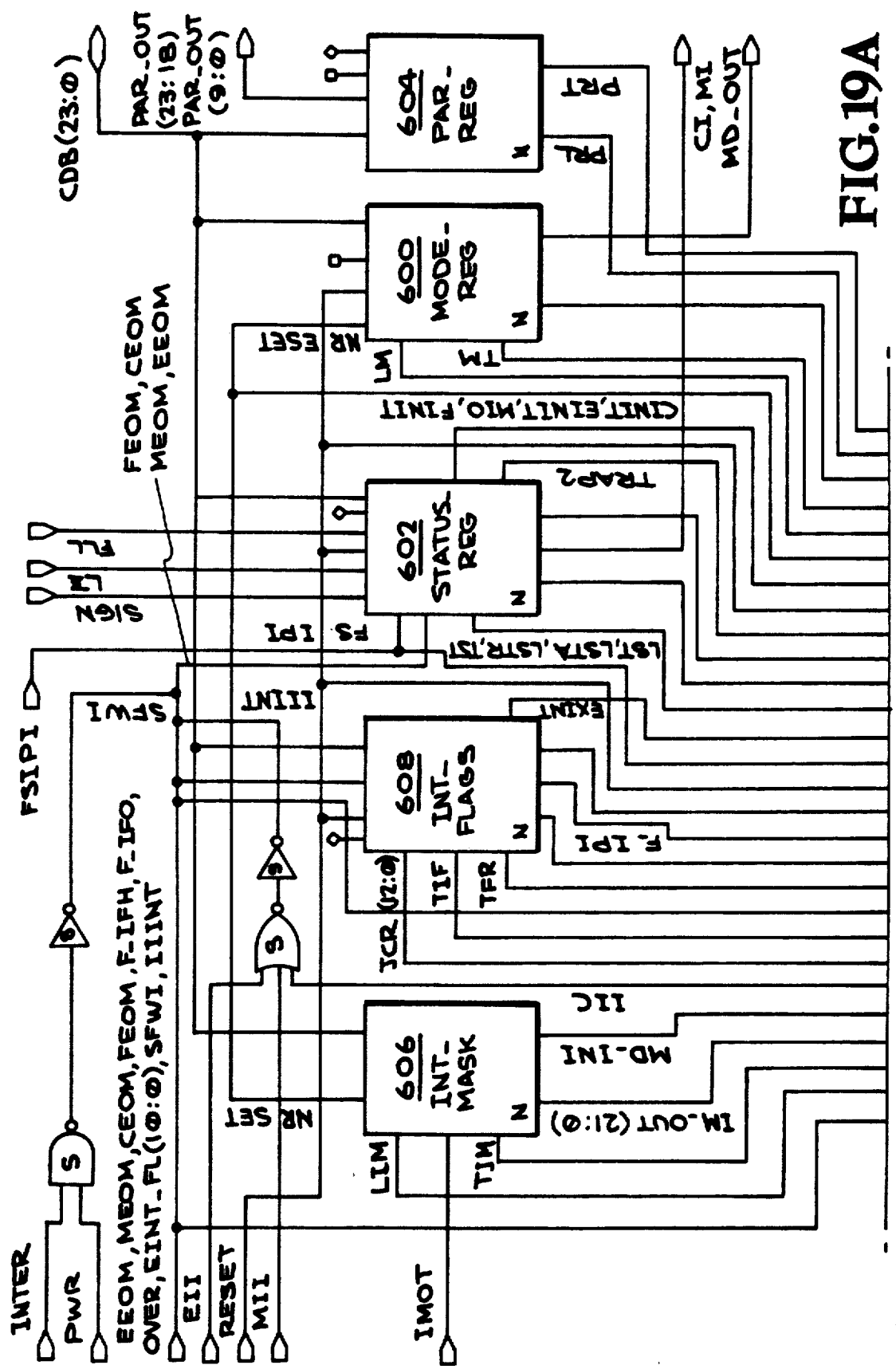
FIGS. 19A-19B are schematic block diagrams of a controlregister unit.
Figure 19B:
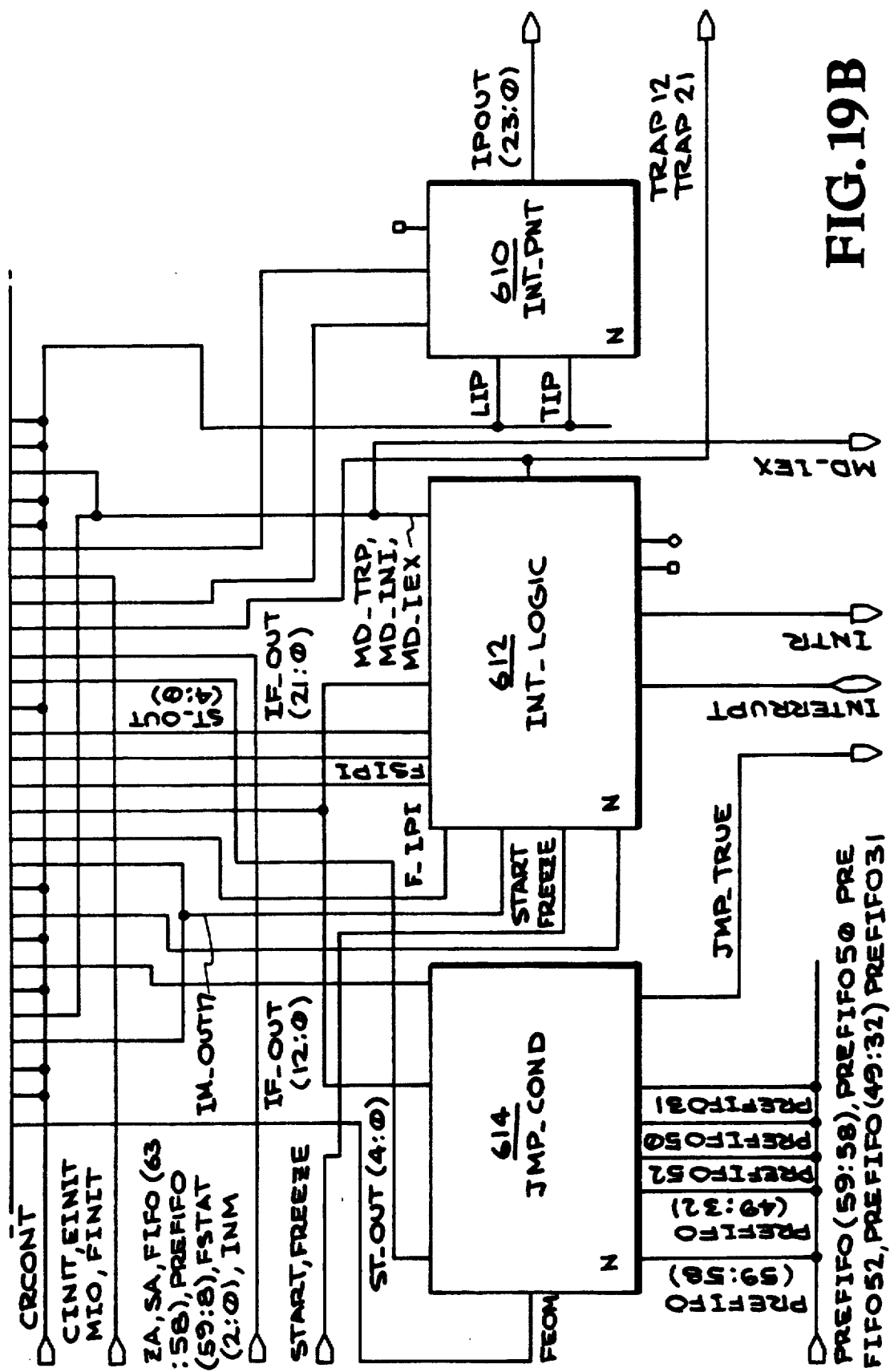
Figure 20:
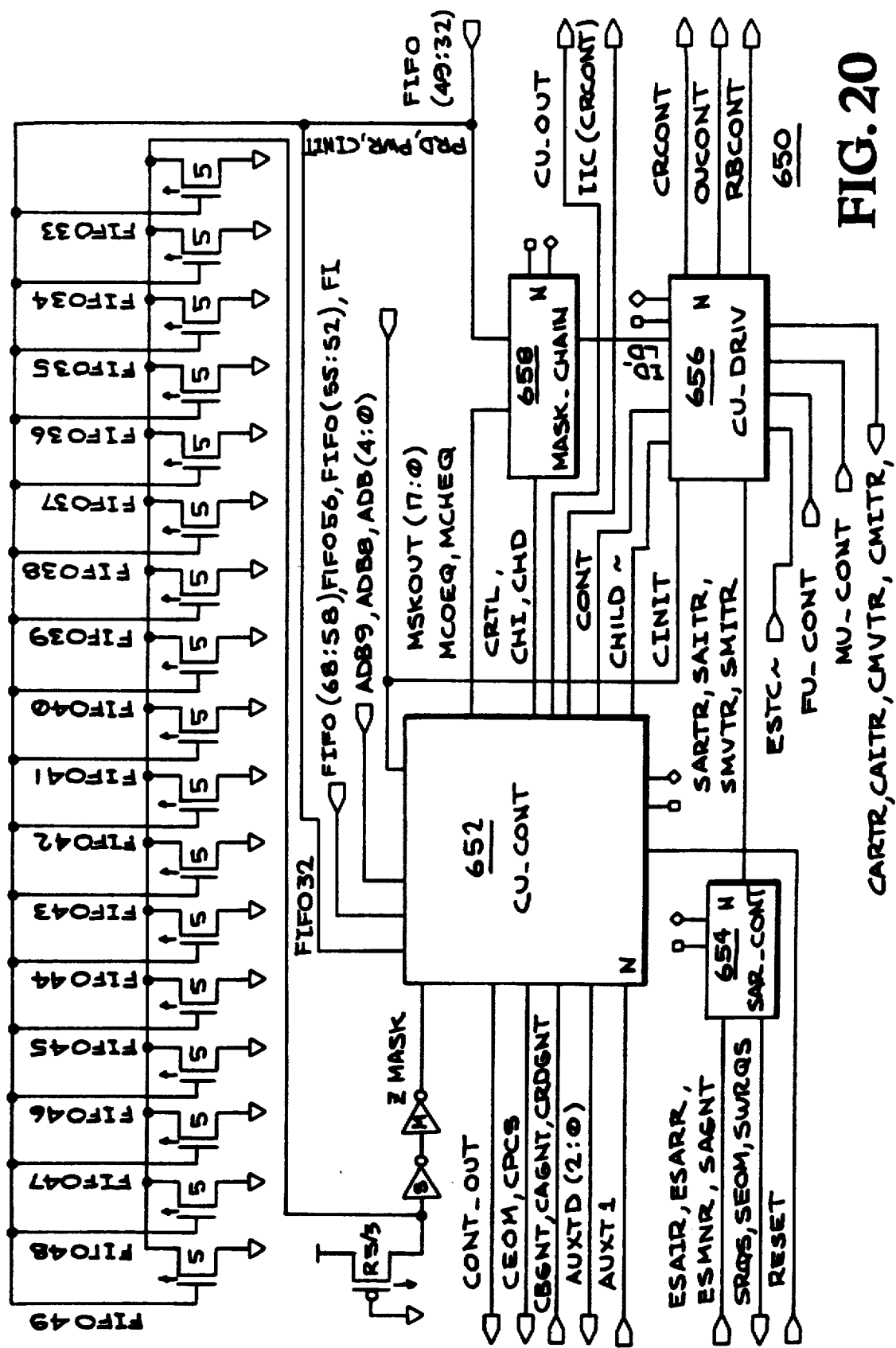
FIG. 20 is a schematic block diagram of a control logic unit.

FIG. 19 shows the control registers which include the following 24-bit registers:
- Mode-Reg—Mode register 600,
- Status-Reg—Status register 602,
- Par-Reg—Parametric register 604,
- Int-Mask—Interrupt mask register 606,
- Int-Flags—Interrupt flags register 608,
- Int-Pnt—Interrupt pointer 610.

All these registers are connected to CDB (23:0) data bus.

Outputs IM-OUT (21:0) and IF-OUT (21:0) from Int-Mas and Int-Flags, respectively, are used in Int-Logic 612 to generate INTERRUPT request to external device if MD-IEX is set and/or initiate interrupt routine by asserting INTR if MD-INI is set. Another block that tests interrupt flags IF-OUT (12:0) and status bits (ST-OUT (4:0) is Jmp-Cond 614 that generates JMP-TRUE condition for the FU.

Control Logic

Figure 21:
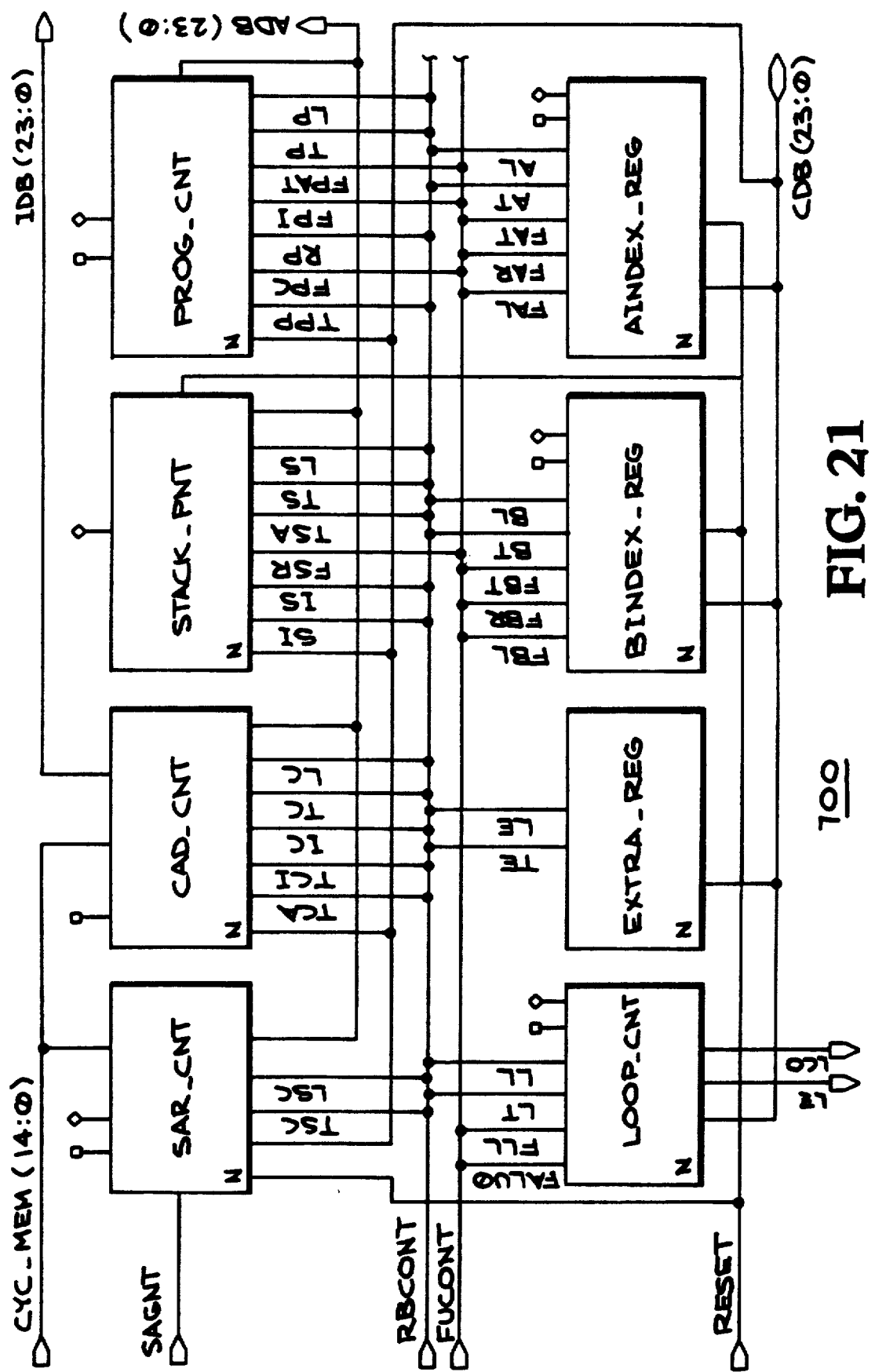
FIG. 21 is a shematic block diagram of a register bank unit.

FIG. 21 shows the Cont-Log 650 which consists of 4 modules: CU-Cont 652 includes state machine, instruction parameters latches, IALU interface, test decoder, registers load-transfer logic and other control circuitry. SAR-Cont 654 handles automatic store of the accumulators and MinMax registers during execution of arithmetic instructions. CU-Driv 656 synchronizes control signals (load, transfer, increment) generated in the CU-Cont and sent to the registers. Mask-Chain 658 determines the registers to operate on in accordance with the instruction register list. The operation continues until the register mask becomes zero.

Register Bank

FIG. 21 shows the Reg-Bank 700 which consists of the following 24-bit registers: Prog-Cnt - Program counter; Stack-Pnt - Stack pointer; CAD-Cnt - CU address counter; SAR-Cnt - SAR counter; Aindex-Reg - A index register; Bindex-Reg - B index register; Extra-Reg - Extra register; and Loop-Cnt - Loop counter.

All these registers are connected to CDB (23:0) data bus. First four registers/counters can be transferred to ADB (23:0) address bus. Two of them, CAD-Cnt and SAR-Cnt, can be limited in their change to a size of cyclic memory via CYC-MEM (14:0). The CAD-Cnt can be also transferred to IDB (23:0) for address calculations in control register instructions. The Loop-Cnt generates two flags when its content is zero: LZ to the Status-Reg and LC0 to the FU.

Operation Unit

Figure 18:
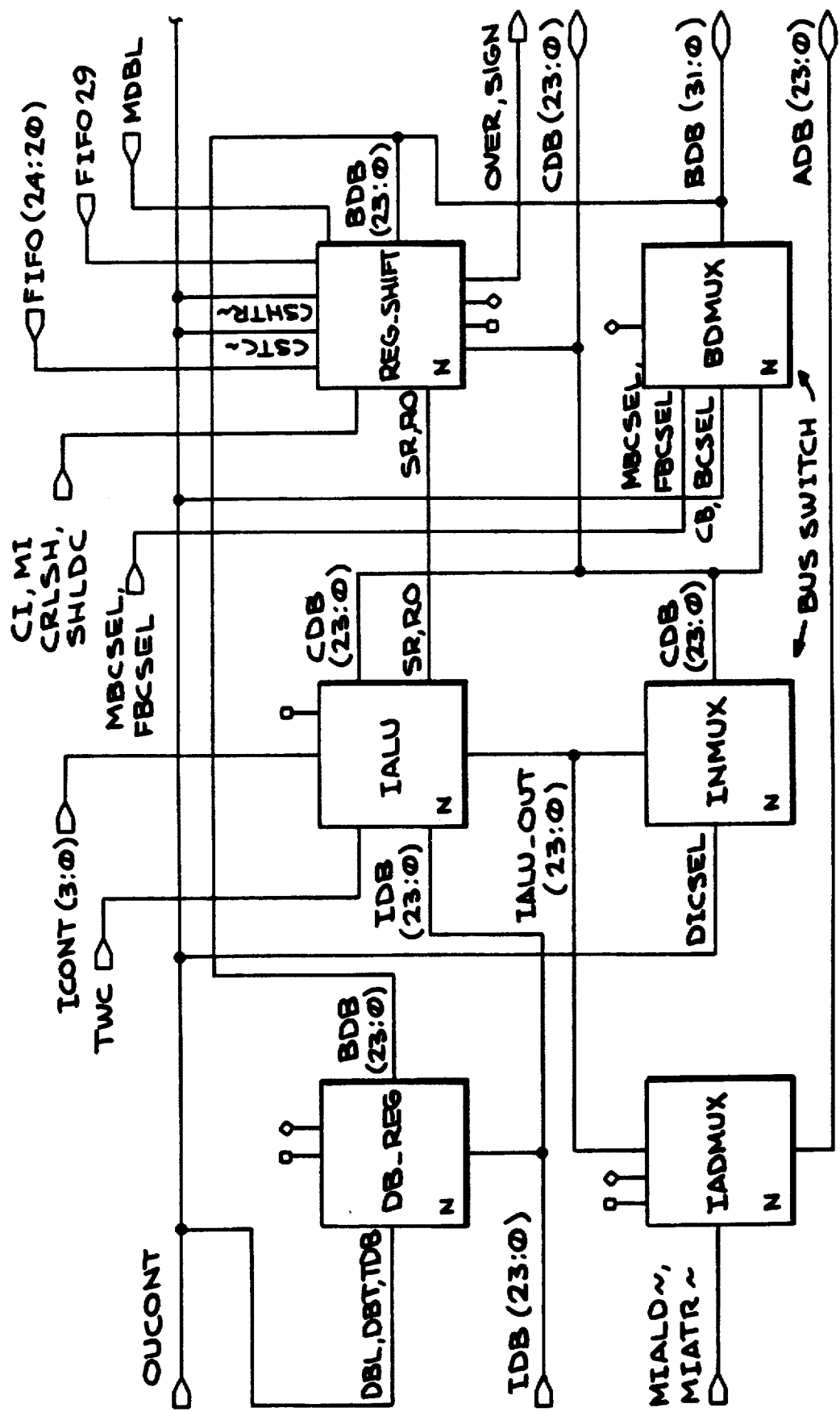
FIG. 18 is a schematic block diagram of an operation unit.

As shown in FIG. 18, the operation unit includes a 24-bit integer ALU and shifter operating on 2's complement and unsigned numbers. The ALU can be allocated for the MU, FU or CU for address calculations or register operations. The shifter is used by the CU and MU. Units' and buses' allocation is done by the Arbiter on a clock basis.

Operands to the operation unit are fetched through CDB, IDB and/or BDB. The results of the operation can be transferred to CDB, BDB (via CDB) or ADB.

Bus Interface Unit

Figure 22A:
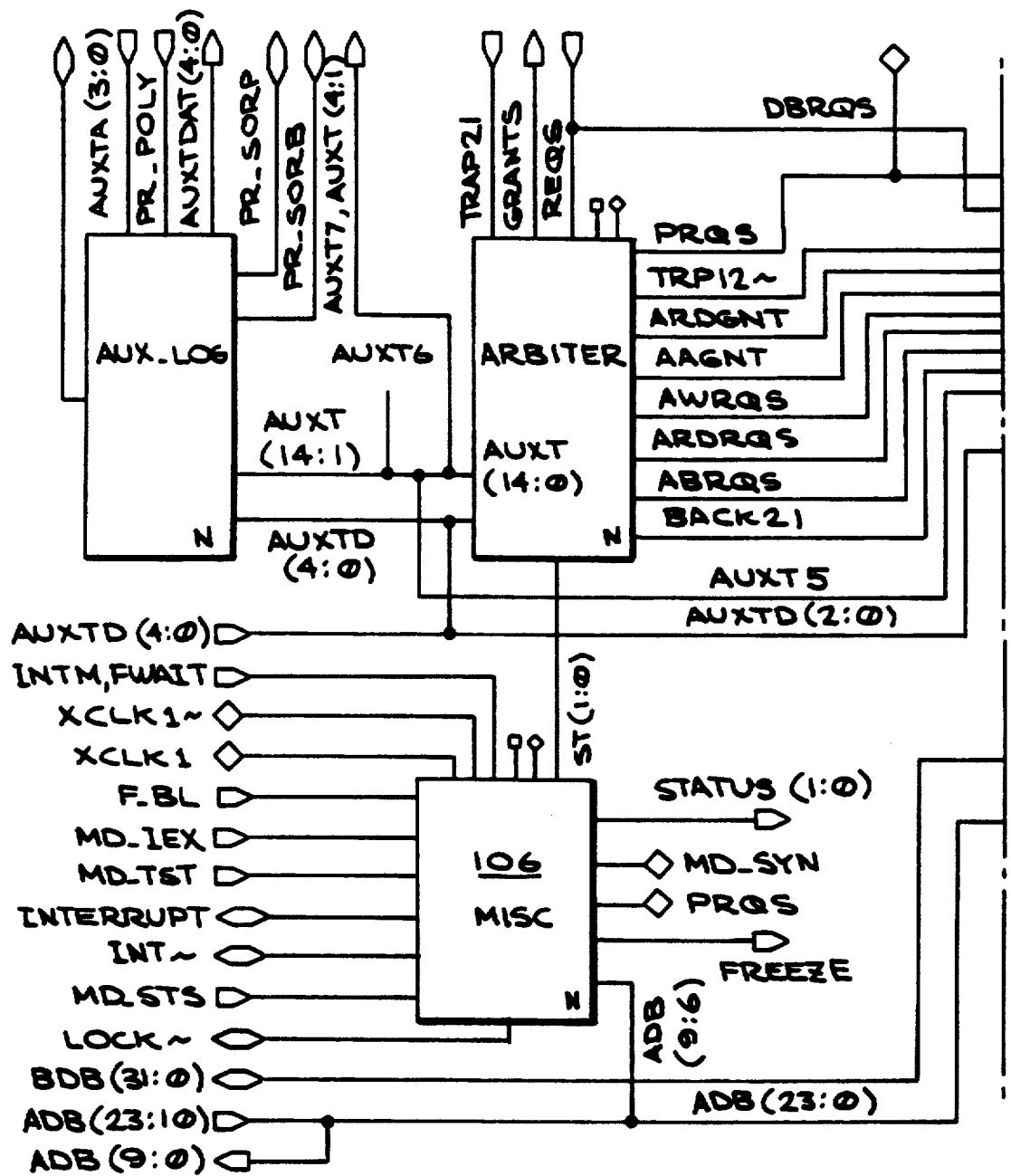
FIGS. 22A-22B are schematic block diagrams of a bus interface unit for a signal processor according to the invention.
Figure 22B:
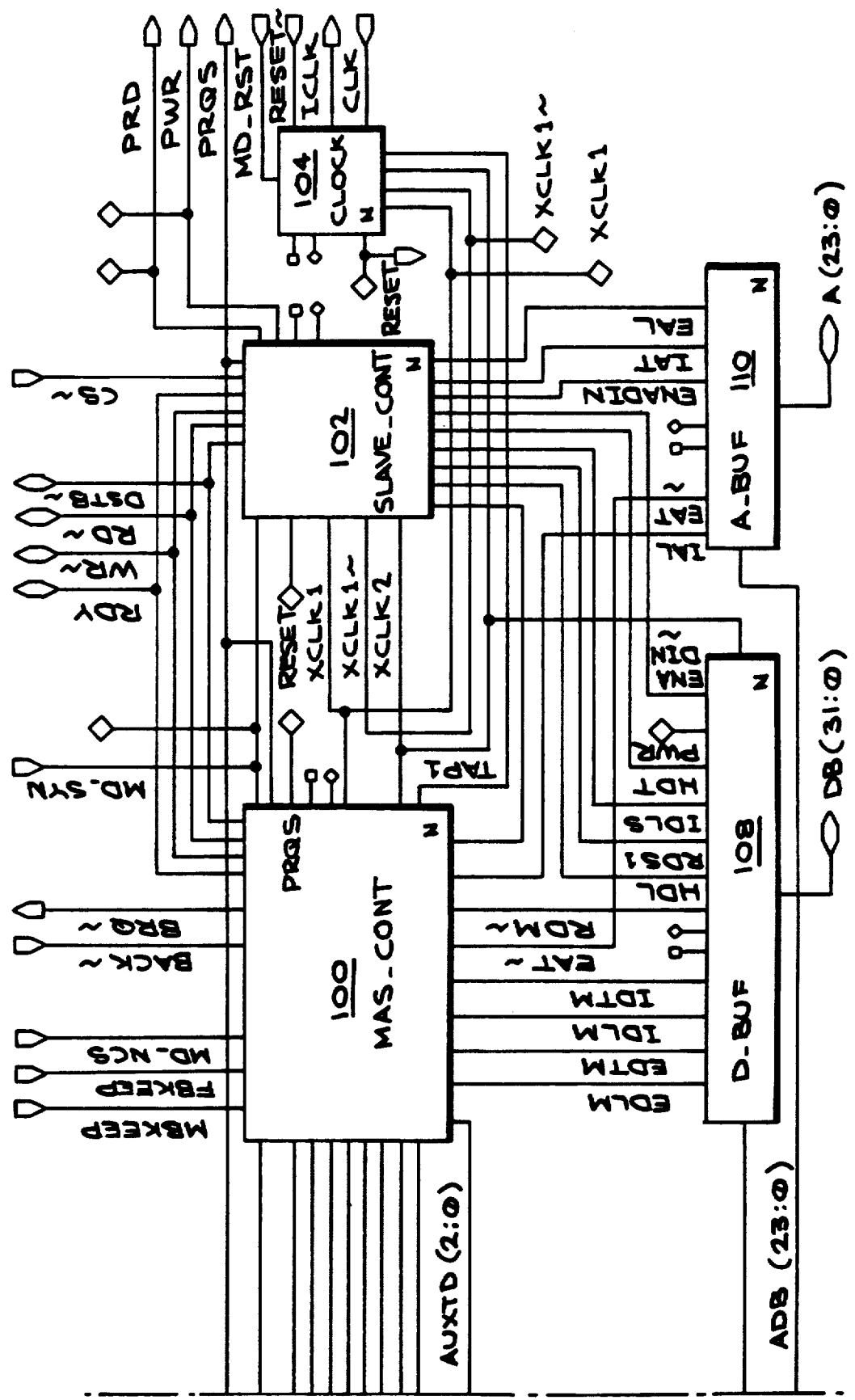

FIG. 22 shows a block diagram of the bus interface unit (BIU) 20 which includes a master control block 100, a slave control block 102, a clock unit 104, miscellaneous circuitry 106, a data buffer 108, and an address buffers 110. The concurrent vector signal processor supports data exchange on a 32-bit data bus with direct addressing of 16 mega-words (24-bit address bus). It provides control lines for read and write operations, bus request-acknowledge handshake ($\overline{BRQ}$ and $\overline{BACK}$ lines), bus lock ($\overline{LOCK}$), interrupt ($\overline{INT}$) requests, and other signals. The concurrent vector signal processor can work with both fast (with no-wait state) and slow memories. When the internal RAM or registers are accessed by an external device, the control lines change their direction. The bus interface unit divides the external clock CLK by two and provides an output signal ICLK for system synchronization. It also resets the processor, when a hardware or software reset is encountered.

FIGS. 22 and 23 show the BIU 20 to include address, data, clock and control buffers; a clock generator, an interface control, and a bus arbiter.

The address buffer A-Buf is an interface between the ZR34325 and external 24-bit address but. It is loaded by IAL signal from internal address bus ADB (23:0). The address is transferred to external bus if EAT is asserted, otherwise the buffer is in tri-state. When an external device accesses the ZR34325 internal memory or registers it uses only ten least significant bits of the address bus. This operation is enabled when ENADIN signal is asserted. The external address is loaded by EAL and transferred to the internal address bus ADB (9:0) when IAT signal is high.

The data buffer D-Buf is an interface between the ZR34325 and external 32-bit data bus. The direction of the data transfer can change in both master and slave modes: (i) to the external bus when master write or slave read is executed and (ii) from the external bus when master read or slave write is performed. The buffer is loaded by IDLS (in slave mode) or IDLM (in master mode) signals from internal data bus BDB (31:0). The data is transferred to external bus if EDTM (in master mode) or RDS1 (in slave mode) is asserted, otherwise the buffer is in tri-state. External data is loaded into the ZR34325 by EDLM (in master mode) or by HDL (in slave mode) and is transferred to the BDB (31:0) bus by asserting IDT and HDT (the latter in slave mode only). The data in transfer is enabled by asserting ENADIN (in slave mode) or by RDM (in master mode).

The Clock circuit consists of:
  clock generator which provides two global nonoverlapped clock phases PH1 and PH2 with a half of external clock CLK frequency,
  reset circuit, which execute hardware and software processor reset,
  delay line that creates a required delay for DSTB output signal
  and circuitry for generating ICLK and miscellaneous clock signals 9XDLK1, XCLK1, XCLK2, etc.).

The Miscellaneous buffer controls the following external signals: STATUS 1:0), $\overline{INT}$ and $\overline{LOCK}$/-$\overline{FREEZE}$. A significance of the direction STATUS (1:0) lines as well as a direction of two other ones is determined by the Mode register. The internal FREEZE signal is generated in the test mode (MD-TST is high and $\overline{FREEZE}$ is low) or during access to the internal RAM by an external device. The internal INTERRUPT line transfers interrupt request in the direction determined by the MID-IEX line.

All internal and external bus operations are controlled by the Arbiter. The arbitration implemented in the ZR34325 uses a constant priority scheme: when several requests for bus operation arrive simultaneously, the bus will be granted to the unit with the highest priority. According to request type the Arbiter returns appropriate 'grants.' Thus for write operation an address grant (e.g., MAGNT) is issued, for internal bus transfer—a bus grant (e.g., CBGNT), and for read access two grant signals are issued: an address grant at the beginning the access and the read grant when the data is ready (e.g., FAGNT and FRDGNT). In some cases two grants can be issued simultaneously as in consecutive reads when read and address grants are asserted to acknowledge completion of the current access and beginning of the next one. The only request which will be served immediately without issuing any grant is PRQS for access of the internal memory and registers by an external device. When PRQS is encounted the processor suspends all bus activities to enable access by an external device.

The request with higher priority is transferred to the Mas-Cont, which controls external bus interface when the ZR34325 masters the bus. The grants coming back to the Arbiter are not personalized, and are transferred to the unit with the highest priority that has requested the granted operation. The TRAP21 input is used to halt immediately all bus operations by forcing all requests from the Arbiter to the Mas-Cont to zero. The request or grant (if BACK21 is high) types are encoded as ST (1:0) to be transferred to the outputs STATUS (1:0). For testing they can be read through the auxiliary bus.

The Mas-Cont handles the external bus accesses when the ZR34325 controls the bus. It generates all the control signals required for the address and data buffers operation as well as following control outputs: $\overline{RD}$, $\overline{WR}$, $\overline{DSTB}$ and $\overline{BRQ}$. The bus access control is implemented in the PPLA, which supports various access lengths and handles bus protocol. The control over external bus is granted to the ZR34325 by the $\overline{BACK}$ signal. The external memory access is completed only when the RDY input is high. In order to save bus release for small and known amount of cycles, 'keep' signals MBKEEP and FBKEEP are used in $\overline{BRQ}$ generating circuit.

The ZR34325 can be accessed by an external device when the internal storage resources (memory and registers) are memory mapped. This 'slave' access is allowed only when the ZR34325 has no bus control ($\overline{BACK}$ is withdrawn). The slave accesses are handled by the Slave-Cont, which similar to the Mas-Cont provides all required signals to the address and data buffers. A slave access starts with asserting the $\overline{CS}$ input line which enables other memory control lines $\overline{RD}$, $\overline{WR}$ and $\overline{DSTB}$ to be treated as inputs. These signals can be either synchronous or asynchronous which effects only access time. During a 'slave' access the Slave-Cont generates PRQS (processor request), PRD (processor read) and PWR (processor write) signals. The RDY signal in 'slave' access is an output signaling that access can be completed.

Block Aux-Log contains test circuits for process test and for on wafer run-time test of the internal state machines and other circuitry.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A concurrent vector signal processor with parallel processing capability for efficiently executing a fast Fourier transform (FFT) algorithm, comprising:

an execution unit for performing floating-point arithmetic processing, said execution unit including a floating-point pipelined multiplier, a floating-point pipelined adder, and a floating-point pipelined adder-subtracter which are operable simultaneously for concurrent operations in FFT execution, a move unit for transferring data between internal and external memories using direct memory access (DMA), a vector buffer unit for decoupling operands to the execution unit from an external bus through said move unit, a fetch unit for fetching instructions for said execution unit and for executing program flow-control instructions, said fetch unit including an instruction FIFO for use in executing short loops and a resource manager for management of processor resources in either a sequential mode of operation or a concurrent mode of operation, said resource manager providing task synchronization, resource allocation, and deadlock avoidance in accessing internal and external busses, a plurality of internal register units, a control unit for performing arithmetic logic and data transfer operations on internal registers and controlling external stack operations for implementing subroutine call and return instructions, an internal data RAM unit reconfigurably organized as an array of complex words with bit reversal addressing for FFT operation, a coefficient lookup table unit containing complex floating-point coefficients for sine and cosine values, multiple buses internal to said processor for interconnecting all said units of said concurrent vector signal processor, and a bus interface unit for controlling access to external memory and including arbiter means for prioritizing said multiple buses internal to said processor and external bus operations between said units of said concurrent vector signal processor.

2. The concurrent vector signal processor of claim 1 wherein said internal register units include control registers for processor internal status, interrupt flags, and instruction loop counts.

3. The concurrent vector signal processor of claim 1 wherein said internal register units include address registers.

4. The concurrent vector signal processor of claim 1 wherein said internal register units include arithmetic registers.

* * * * *